US008999468B2

(12) United States Patent
Sisson et al.

(10) Patent No.: US 8,999,468 B2
(45) Date of Patent: *Apr. 7, 2015

(54) ARTICLE COMPRISING LIGHT ABSORBENT COMPOSITION TO MASK VISUAL HAZE AND RELATED METHOD

(71) Applicants: Edwin Andrew Sisson, Medina, OH (US); Arianna Giovannini, Tortona (IT); Simone Ferrero, Tortona (IT)

(72) Inventors: Edwin Andrew Sisson, Medina, OH (US); Arianna Giovannini, Tortona (IT); Simone Ferrero, Tortona (IT)

(73) Assignee: M&G USA Corporation, Apple Grove, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,153

(22) Filed: Jun. 23, 2014

(65) Prior Publication Data

US 2015/0070795 A1  Mar. 12, 2015

Related U.S. Application Data

(63) Continuation of application No. 14/020,995, filed on Sep. 9, 2013, which is a continuation of application No. 13/648,419, filed on Oct. 10, 2012, now Pat. No. 8,535,772, which is a continuation of application No.
(Continued)

(51) Int. Cl.
*B32B 1/08* (2006.01)
*B32B 27/08* (2006.01)
(Continued)

(52) U.S. Cl.
CPC ............... *B32B 27/20* (2013.01); *B32B 27/08* (2013.01); *B32B 27/18* (2013.01); *B32B 27/36* (2013.01);
(Continued)

(58) Field of Classification Search
USPC ......... 428/35.7, 36.4, 36.6, 36.7, 36.9, 36.91, 428/475.2, 480; 524/500, 502, 537–539, 524/542
See application file for complete search history.

(56) References Cited

U.S. PATENT DOCUMENTS

| 4,501,781 A | 2/1985 | Kushida et al. |
| 4,521,556 A | 6/1985 | Adams |

(Continued)

FOREIGN PATENT DOCUMENTS

| EP | 0921144 A1 | 9/1999 |
| EP | 0964031 A2 | 12/1999 |

(Continued)

OTHER PUBLICATIONS

Vito Biundo, Specifying Amber Glass Color in Order to Protect Beer From Developing LightStruck Character, Technical Quarterly, vol. 37, No. 2, 2000 pp. 223-238 (Chart Spectra).
(Continued)

*Primary Examiner* — Walter B Aughenbaugh
(74) *Attorney, Agent, or Firm* — Edwin A. Sisson, Attorney at Law, LLC

(57) ABSTRACT

A transparent article includes a continuous polyester matrix having at least one incompatible filler dispersed therein. The incompatible filler provides domains in the polyester matrix, each domain having a particular dimension, thus providing a range of dimensions for the domains in the article. To create haze, the dimensions are within the range of from about 380 nm to about 720 nm. Once the range of dimensions is determined, a light absorbent composition can be found which absorbs light at a range of wavelengths that at least substantially covers the range of dimensions of the domains. In doing so, it has been found that the haze of the article can be substantially masked. Method for producing the article and for masking the haze are also provided.

16 Claims, 14 Drawing Sheets

Related U.S. Application Data

13/340,936, filed on Dec. 30, 2011, which is a continuation of application No. 12/823,447, filed on Jun. 25, 2010, now Pat. No. 8,057,874, which is a continuation of application No. 10/769,167, filed on Jan. 30, 2004, now Pat. No. 7,833,595.

(60) Provisional application No. 60/444,313, filed on Jan. 31, 2003.

(51) Int. Cl.
| B32B 27/34 | (2006.01) |
|---|---|
| B32B 27/36 | (2006.01) |
| C08L 67/00 | (2006.01) |
| B32B 27/18 | (2006.01) |
| B32B 27/20 | (2006.01) |
| G02B 1/04 | (2006.01) |
| G02B 5/22 | (2006.01) |

(52) U.S. Cl.
CPC ....... *B32B 2250/02* (2013.01); *B32B 2307/412* (2013.01); *B32B 2307/7242* (2013.01); *B32B 2439/00* (2013.01); *G02B 1/04* (2013.01); *G02B 5/22* (2013.01)

(56) References Cited

U.S. PATENT DOCUMENTS

| | | | |
|---|---|---|---|
| 4,654,249 A | 3/1987 | Barbey et al. | |
| 4,654,399 A | 3/1987 | Callander et al. | |
| 4,837,115 A | 6/1989 | Igarashi et al. | |
| 5,021,515 A | 6/1991 | Cochran et al. | |
| 5,258,233 A | 11/1993 | Mills et al. | |
| 5,300,572 A | 4/1994 | Tajima et al. | |
| 5,314,987 A | 5/1994 | Kim et al. | |
| 5,475,046 A | 12/1995 | Son et al. | |
| 5,633,080 A | 5/1997 | Siddiqui et al. | |
| 5,674,618 A | 10/1997 | Lee et al. | |
| 6,083,585 A | 7/2000 | Cahill et al. | |
| 6,174,655 B1 | 1/2001 | Shirokura et al. | |
| 6,200,659 B1 | 3/2001 | Fujimori et al. | |
| 6,288,161 B1 | 9/2001 | Kim et al. | |
| 6,346,307 B1 | 2/2002 | Al Ghatta et al. | |
| 6,444,283 B1 | 9/2002 | Turner et al. | |
| 6,506,463 B1 | 1/2003 | Cahill et al. | |
| 6,737,464 B1 | 5/2004 | Bagrodia et al. | |
| 6,787,589 B2 | 9/2004 | Weaver et al. | |
| 8,535,772 B2 * | 9/2013 | Sisson et al. ................. | 428/35.7 |
| 2002/0001684 A1 | 1/2002 | Kim et al. | |
| 2003/0134966 A1 | 7/2003 | Kim et al. | |
| 2005/0238885 A1 | 10/2005 | Takeda et al. | |

FOREIGN PATENT DOCUMENTS

| | | | |
|---|---|---|---|
| EP | 1167447 A2 | 1/2002 | |
| EP | 1167447 A3 | 11/2002 | |
| JP | 169682 A1 | 6/2000 | |
| JP | 342456 A1 | 3/2003 | |
| WO | 0034377 A1 | 6/2000 | |
| WO | 0238673 A2 | 5/2002 | |
| WO | 03029349 A1 | 4/2003 | |
| WO | 2007042230 A1 | 4/2007 | |

OTHER PUBLICATIONS

Taylor, E.C and Poole, J.P., A Method for Evaluating the Light Protection of Amber Glass, American Society of Brewing Chemists, May Second through Sixth, 1971, Annual Meeting, Montreal, Que. Canada, pp. 238-245; Spectra.
Americhem Inc., Plastics Engineering, Feb. 2002 p. 38 (See second paragraph, Chart).
Polyone Presentation, Polymers 2003, Sep. 18, 2003. Beogradski sajam, un-numbered pages. Note: This document has been presented to a foreign patent office with self validation of its authenticity. Applicants are making the Examiner aware of its presence, but make no statement as to its proper date or authenticity.
Mark Stewart and John Mann, PET Beer Bottles, Master Brewers Association of the Americas Brewery Packaging Technology Course, Mar. 23, 2001.
Clauberg, H. and Duncan, S., Light Protecting PET for Transparent Fruit Juice Packaging, SME Pasteurization and Extraction Technology for Juice Manufacturing, Nov. 30 & Dec. 1, 1999.
DeHoff, R.T., The Determination of the Size Distribution of Ellipsoidal Particles from Measurements Made on Random Plane Sections, Transactions of the Metallurgical Society of AIME vol. 224, Jun. 1962 p. 474-477.
Dr. Schweitzer, Opposition Brief Against EP B 1 590 398, Zounek Plate Schweitzer, Jan. 11, 2008. Although not prior art, this whole document pertains to the patent in suit.
Declaration of Geoffrey R. Scantlebury, In matter of: European Patent No. 1 590 398, Jan. 9, 2008: whole document.
Fogarty, Kevin M. "The Resin Crystal Ball", Proceedings of NovaPack Americas 2004, (2004) pp.25-30. plus Polyshield handout.
Marushashi and Iiad, "Transparency of Polymer Blends", Polymer Engineering and Science, Nov. 2001, vol. 41, No. 11: p. 1987,para2; Abstract.
Peter Klusmann, "Proprietor Response to Opposition Brief", Aug. 18, 2008.
Klaus Schweitzer, "Opponent Response to Proprietor's Submission", May 4, 2009.
Geoffrey R. Scantlebury, "Declaration 2 of Geoffrey R. Scantlebury", Apr. 27, 2009, Although labeled as a declaration, applicants do not accept it as complying with US law as a declaration.
Geoffrey R. Scantlebury, "Declaration 4 of Geoffrey R. Scantlebury", Apr. 27, 2009, Although labeled as a declaration, applicants do not accept it as complying with US law as a declaration.
Geoffrey R. Scantlebury, "Declaration 5 of Geoffrey R. Scantlebury", Apr. 27, 2009, Although labeled as a declaration, applicants do not accept it as complying with US law as a declaration.
Geoffrey R. Scantlebury, "Declaration 3 of Geoffrey R. Scantlebury", Apr. 27, 2009, Although labeled as a declaration, applicants do not accept it as complying with US law as a declaration.
Peter Anderson, Recycleworlds Consulting, "How Local Recycling Programs Can Work Contructively With the Brewery Indusrty in Order to Develop a Recycle-Friendly Plastic Beer Bottle", Proceedings From Nova-Pack Americas 2000, pp. 1-11, Biography Included.
Daniel A. Abramowicz, Crown Cork & Seal Company, Inc., "Beer in PET (or Technology and the Barrier Derby)", Proceedings From PET Strategies 2000 Conference, pp. 1-14, Biography Included.
Gordon Bockner and Robert Miller, Business Development Associates, Inc., "Beer in PET", Proceedings From PET Strategies 2000 Conference, pp. 1-24, Biography Included.
Nick Huige, Nico Consulting "Evaluating Barrier-Enhancing and Scavenger Technologies for Plastic Beer Bottles", MBAA TQ vol. 39, No. 4, 2002, pp. 218-230.
Dr. Klaus Schweitzer, GA "Brief Submitted to EPO Re Opposition of EP 1590398 Masking of Visual Haze", Sep. 28, 2009.
Geoffrey R. Scantlebury, "Declaration 6 of Geoffrey R. Scantlebury", Sep. 25, 2009.
William Bell, USPTO "Office Action for U.S. Appl. No. 11/618,437", Feb. 3, 2009.
William Bell, USPTO "Office Action for U.S. Appl. No. 11/618,437", Nov. 10, 2009.
Edwin A. Sisson, "Response to Office Action for U.S. Appl. No. 11/618,437, Issued Feb. 3, 2009", Jul. 30, 2009.
Douglas David Callander, "Declaration #1 of Douglas David Callander", Jul. 30, 2009.
Virginia A. Davis, "Declaration #1 of Virginia A. Davis", Dec. 2009.
Edwin A. Sisson, "Response to Office Action for U.S. Appl. No. 11/618,437, Issued Nov. 10, 2009", Dec. 17, 2009.
Dr. Schweitzer, Opposition Brief Against EP B 1 590 398, Zounek Plate Schweitzer, Apr. 17, 2010. Although not prior art, this whole document pertains to the patent in suit.
Proprietor's submission Mar. 19, 2010, in matter of: European Patent No. 1 590 398, Mar. 19, 2010: whole document.
Dr. Kevin L. Rollick, Declaration #1 of Dr. Kevin L. Rollick.

(56) References Cited

OTHER PUBLICATIONS

USPTO Office Action for U.S. Appl. No. 11/617,248, Mar. 12, 2008.
Response to Office Action for U.S. Appl. No. 11/617,248, Issued Mar. 12, 2008, May 15, 2008.
USPTO Office Action for U.S. Appl. No. 10/769,167, Mar. 14, 2008.
Response to Office Action for U.S. Appl. No. 10/769,167, Issued Mar. 14, 2008, May 15, 2008.
USPTO Office Action for U.S. Appl. No. 10/769,167, Dec. 7, 2005.
Response to Office Action for U.S. Appl. No. 10/769,167, Issued Dec. 7, 2005, Feb. 27, 2006.
Response to Office Action for U.S. Appl. No. 10/769,167, Issued Dec. 7, 2005, Apr. 4, 2006.
USPTO Office Action for U.S. Appl. No. 10/769,167, Aug. 11, 2006.
Response to Office Action for U.S. Appl. No. 10/769,167, Issued Aug. 11, 2006, Aug. 21, 2006.
USPTO Office Action for U.S. Appl. No. 11/618,437, Nov. 23, 2010.
Suplemental Amendement for U.S. Appl. No. 10/769,167, May 27, 2008.
Suplemental Amendement for U.S. Appl. No. 10/769,167, Nov. 13, 2006.
Response to Office Action for U.S. Appl. No. 10/769,167, May 15, 2008.

* cited by examiner

FIG — 5

ARTICLE COMPRISING LIGHT ABSORBENT COMPOSITION TO MASK VISUAL HAZE AND RELATED METHOD

CROSS REFERENCE TO RELATED APPLICATIONS

This application is a continuation of U.S. patent application Ser. No. 14/020,995 filed on 9 Sep. 2013 which is a continuation of U.S. patent application Ser. No. 13/648,419 filed on Oct. 10, 2012 and is now granted U.S. Pat. No. 8,535,772 which is a continuation of U.S. patent application Ser. No. 13/340,936 filed on Dec. 30, 2011 now abandoned which is a continuation of U.S. patent application Ser. No. 12/823,447 filed on Jun. 25, 2010 and is now granted U.S. Pat. No. 8,110,264 which is a continuation of U.S. patent application Ser. No. 10/769,167 filed on Jan. 30, 2004 and is now granted U.S. Pat. No. 7,833,595 and claims the benefit of U.S. Provisional Application Ser. No. 60/444,313, filed on Jan. 31, 2003. The teachings of all of which are incorporated in their entirety. Other related Applications are application Ser. No. 11/618,437, which is a divisional of Ser. No. 10/769,167 and is now granted U.S. Pat. No. 8,052,917; application Ser. No. 11/617,248, which is a continuation of Ser. No. 10/769,167 and is now granted U.S. Pat. No. 7,438,960; application Ser. No. 12/823,306, which is a continuation of Ser. No. 10/769,167 and is now granted U.S. Pat. No. 8,053,050; application Ser. No. 12/823,422, which is a continuation of Ser. No. 10/769,167 and is now granted U.S. Pat. No. 8,067,074; and application Ser. No. 12/823,486, which is a continuation of Ser. No. 10/769,167 and is now granted U.S. Pat. No. 8,057,874.

BACKGROUND OF THE INVENTION

This invention relates to the production of a transparent article and, more particularly, to the production of a shaped, transparent thermoplastic article, such as a container or bottle, having an incompatible filler, preferably a gas barrier strengthening filler dispersed therein, wherein the light absorption of the article has been altered to effectively mask or reduce the visual haze of the article.

Thermoplastic polymers, such as polyesters, have long been used in the production of packaging materials, including preforms which are then blown or otherwise oriented into a desired form as necessary for the production of plastic articles such as containers and/or bottles for food and beverage storage and delivery. Among the most preferred and cost-effective thermoplastic polymers used for this purpose are poly (ethylene phthalate) resins. Poly(ethylene terephthalate) (PET), as well as other polyesters, when processed properly under the right conditions and oriented into a desired shape, provides a high clarity, low haze article. Consequently, the plastic bottling industry has used PET and similar polyesters for several years in its production of plastic containers and bottles for food and beverages.

Unfortunately, while plastic containers made from polyester, provide excellent high strength containers having excellent gas barrier properties for most foods and beverages, they are presently not suitable as beer containers or other food containers where extremely low gas permeability is required. It will be appreciated that when oxygen and other air gases come into contact with certain foods and beverages, such as beer for example, the beer oxidizes or otherwise becomes stale. Consequently, attempts have been made heretofore to reduce the oxygen/gas permeability of the container or, stated another way, to increase the gas barrier strength of the container.

One known way to reduce oxygen/gas permeability or to increase the gas barrier strength of the container is to blend certain gas barrier strengthening fillers with the polyester in the container. For instance, certain polyamides, such as polyxylylene amides, are well known in the art to provide improved gas barrier strength to polyester containers. To produce these containers, the filler is typically blended or dispersed in the polyester by processes known in the art and then the article is manufactured. In some instances, the containers may be molded as by injection molding and the like. In other instances, preforms of the containers are prepared such as by injection molding or extrusion, and are then blown or otherwise oriented into the desired size and shape.

Various patents and patent publications have taught the use of polyester/polyamide blend compositions for forming an article having low haze and reduced gas permeability compared to polyester alone. In at least one patent publication, in order to provide a low haze/low gas permeability container, it is stated that the blend composition employ a polyamide having a number average molecular weight of less than 15,000. That patent publication further makes it clear that blends of higher molecular weight polyamides with polyester are known to have high haze values which limit their practical use in the food and beverage container industry.

In other words, heretofore, few, if any, blends of polyester and these gas barrier strengthening fillers, such as higher molecular weight polyamides, have been used in the plastic container or bottling industry, or any industry where transparent, high clarity articles are desired, because it is a well-known fact that, upon orienting or stretching an article containing a blend of polyester and polyamide, the article loses much of its clarity and transparency, i.e., becomes visually cloudy or hazy. This characteristic is known in the industry as haze.

Haze, as described in most of the patent literature, can be measured, much like any other physical property. Measurements to determine the level or amount of haze may be obtained using a colorimeter (e.g., Hunter Lab Color Quest) and following ASTM D1003. Haze is typically reported as a percentage based upon the thickness of the article and can be calculated by the equation $$\text{Haze \%} = \frac{T_{Diffuse}}{T_{Total}} \times 100$$

where Haze % equals transmittance haze, $T_{Diffuse}$ equals diffuse light transmittance, and $T_{Total}$ equals total light transmittance. A 4% haze measurement in a container sidewall approximately 15 mils thick is normally visible to the naked eye. Generally, when testing containers made from different blends of polyester and polyamides, haze values have been measured in the 15% to 35% range for these 15 mil thick containers. For purposes of this invention, this type of haze will often be referred to hereinafter as "physical haze" or "measured haze."

Moreover, as the amount of gas barrier strengthening filler used in the polyester/filler blend increases, the physical haze value also increases. In fact, it has been found by others that effective blend ratios of polyester (e.g., PET) and aromatic polyamides (e.g., poly(m-xylylene adipamide) commonly referred to as MXD6) provide for physical haze values in the 20% to 30% range upon orienting the polymers into the form of a container again having a wall thickness of about 15 mils.

Heretofore, efforts have focused on reducing the gas permeability of the article by addition of gas barrier strengthening fillers, while, at the same time, trying to reduce the amount of physical haze produced upon orientation of the article. Such efforts, where successful, have generally found that to reduce physical haze, the size of the molecules of the filler had to be significantly small. Generally, it is understood, as stated above, that polyamides having a number average molecular weight of less than 15000 in a concentration of less than 2 percent by weight are needed to sufficiently reduce physical haze. Alternatively, it has been found that, where polyamide domains in the polyester have been limited to an average number size of from 30 to 200 nanometers, physical haze will also be reduced or limited. At least one theory for this phenomenon is that the polyamide particles are so small that they fail to scatter light, particularly in the visible spectra, i.e., the particles do not reflect light to the observer in a manner detectable to the naked eye. Moreover, in measuring the physical haze using machines such as a colorimeter, it is clear that the physical haze measured has been reduced or potentially even eliminated.

Based upon this theory, it should be understood then that, where those particles or domains surrounding the filler are much larger than 200 nanometers, say on the order of 400 to 700 nanometers, the haze of the article is not only physically measurable, but also may be visible to the ordinary observer. In fact, at least one journal article expressly recognizes that the number and size of the dispersed particles does create measured haze. It is further noted therein that stretching makes for even more measured haze because, firstly, stretching increases the size of the dispersed particles in a sheet plane and, secondly, the difference in the anisotropic refractive indices of the matrix and the dispersed phase increases. Thus, some patents have attempted to prevent the stretching or reorienting of the MXD6 domains, for example, by producing bottles of PET and MXD6 when the polymer is in its molten state.

Hence, all of the prior art has focused on the physical haze phenomenon and the reduction or elimination thereof. In contrast, the present invention focuses on the visual aspect of the haze property since it is this characteristic which is believed to be detrimental to the cosmetic appearance and practical use of the article, not the physical haze of the article.

Heretofore, however, this "visual haze" or "visible haze" of an article has never been considered separate and apart from the physical haze of the article, as it is generally immeasurable by traditional physical testing of the article. By "visual haze" or "visible haze," it is meant that haze which can be observed optically or visually by a person in ordinary direct or indirect light. It is the haze that is visible to the naked eye of the observer, presumably due to the reflectance or transmittance of the light from the filler domains present in the article. It is believed that the visual masking of the physical haze phenomenon results in the elimination or reduction of this "visual haze," and can provide an article suitable for commercial use. To that end, it will be understood that "visual haze" is not a measured physical property to the same extent that the physical haze of an article is determinable on a colorimeter or the like, and eliminating or reducing visual haze may or may not reduce the measured physical haze of the article.

Accordingly, eliminating or reducing the "visual haze" of an article, regardless of the physical haze measurements, is seen as highly desirable to the art, particularly to the plastic container and bottling industry. Thus, there remains a need to provide a process by which to mask the visible haze of a transparent article made from polyester blended with a gas barrier strengthening filler, as well as for transparent, preferably oriented, articles comprising a polyester/filler blend that is aesthetically and visually acceptable to the plastic container and bottling industry.

SUMMARY OF THE INVENTION

Broadly, the present invention is directed to the production of a transparent article such as a plastic container or bottle made from a major component of thermoplastic polymer and a minor component of an incompatible filler. Such an article, particularly when oriented or stretched, will typically produce a haze. It has been unexpectedly found that the haze of the transparent article visible to the naked eye may be substantially masked or, put another way, the visible haze of the article may be eliminated or substantially reduced (not necessarily on physical terms, but on visibility terms), by altering the light absorption of the article at wavelengths that at least substantially correlate with the size dimensions of the domains in the thermoplastic polymer formed upon formation of the article. Importantly, the particular dimensions with which the wavelengths are to be correlated are those in the axial plane of the article. It will be understood that, by the term "substantially masked," it is meant that the alteration of the light absorption of the article does not necessarily affect the measured physical haze of the article, but does substantially reduce or nearly eliminate that haze visible to the naked eye. The measured physical haze of the article may not be affected by the light absorbent composition at all, may be affected by the composition by only slightly reducing the measured haze in the article, or may be affected significantly by the light absorbent composition, depending upon the actual light absorbent composition and the amount employed. In any event, the visually observable haze of an article is "substantially masked" or substantially undetectable to the naked eye of the ordinary observer, but physical haze is still generally measurable by a colorimeter to be above ordinarily acceptable limits.

One manner of altering the light absorption of the article is to employ an effective amount of one or more light absorbing compositions known to absorb light at wavelengths which at least substantially cover, and more preferably, at least substantially correlate to most, if not all, of the dimensions of the domains found in the axial plane of the article. It will be appreciated that, for purposes of this invention, at least some, and more preferably, at least a majority of these dimensions of the domains will necessarily have a size falling within the range from about 400 nm to about 700 nm, which substantially corresponds to the visible spectrum (i.e., from about 380 nm to about 720 nm). By utilizing a light absorbing composition, such as a colorant, that has a known region of absorption at wavelengths within the visible spectrum, one can substantially correlate the wavelengths, in nanometers, within the region of absorption of the composition to the dimensions, also in nanometers, of the filler domains found in the article. By using one or more particular light absorbing compositions having a region of absorption that at least substantially covers the range of dimensions of the domains containing the filler found in the thermoplastic filler that fall within the visible spectrum, it has been found that "visual haze," as defined herein above, is substantially reduced, if not eliminated, and physical haze is masked in the article.

Furthermore, experimentation has provided a more detailed approximation of the amount of light absorbing composition required to "substantially cover" the range of dimensions of the domains containing the filler. More particularly, a composition that absorbs light such that X is less than 9.6 in the equation $$X=\Sigma(1-A_i)\times(N_i)$$

where $A_i$ is the percent of light absorbed at a wavelength i and $N_i$ is the number of domains per hundred square microns at wavelength i, and where i ranges from 400 nm to 700 nm, is considered to substantially cover the domains and at least start to reduce the visual haze of an article. It will be recognized that an alternative expression of this equation is $$X=\Sigma(L_i)\times(N_i)$$

where $L_i$ is the percent of light not absorbed (i.e. that is available to reflect) at a wavelength i.

The advantages of the present invention over existing prior art relating to transparent articles employing polyester and incompatible fillers, which shall become apparent from the description and drawings that follow, are accomplished by the invention as hereinafter described and claimed.

In general, one or more aspects of the present invention may be achieved by a transparent article comprising a thermoplastic polymer matrix; a plurality of domains, each encompassing at least one incompatible filler, dispersed in the polyester matrix, the domains having a range of dimensions in an axial plane of the article, wherein the dimensions of at least some of the domains in the axial plane of the article fall within a range of from about 400 nm to about 700 nm; and an effective amount of at least one light absorbent composition, wherein the at least one light absorbent composition absorbs light in a region of the visible spectrum at wavelengths that at least substantially covers the range of dimensions of the domains in the article, to substantially mask any visual haze of the transparent article.

One or more other aspects of the present invention may be accomplished by a process for the production of a transparent article made of a blend of a major component of polyester, a minor component of at least one incompatible filler dispersed therein, and at least one light absorbent composition, comprising blending the filler into the polyester; forming an article into a desired size and shape, wherein domains comprising the incompatible filler are created in the polyester upon formation of the article; determining a range of dimensions in the axial plane of the article for the domains in the polyester, at least some of the dimensions falling within a range of from about 400 nm to about 700 nm; finding a light absorbent composition that absorbs light in a region of the visible spectrum at wavelengths that at least substantially covers the range of dimensions of the domains in the polyester; and adding an effective amount of the light absorbent composition to the polyester and the incompatible filler and forming a different, transparent container into the same desired size and shape, to substantially mask any visual haze in the article.

Still one or more other aspects of the present invention may be achieved by a transparent article comprising a thermoplastic polymer matrix; a plurality of domains, each encompassing at least one incompatible filler, dispersed in the polyester matrix, the domains having a range of dimensions in an axial plane of the article, wherein the dimensions of at least some of the domains in the axial plane of the article fall within a range of from about 400 nm to about 700 nm; and at least one light absorbent composition, wherein the at least one light absorbent composition absorbs light in a region of the visible spectrum such that X is less than 9.6 in an equation $$X=\Sigma(1-A_i)\times(N_i)$$

where $A_i$ is the percent of light absorbed at a wavelength i, where $N_i$ is the number of domains per hundred square microns at wavelength i, and where i ranges from 400 nm to 700 nm.

Yet one or more other aspects of the present invention may further be achieved by a process for the production of a transparent article made of a blend of a major component of polyester, a minor component of at least one incompatible filler dispersed therein, and at least one light absorbent composition, comprising blending a selected amount of the filler into the polyester; forming an article into a desired size and shape, wherein domains comprising the incompatible filler are created in the polyester upon formation of the article; determining a range of dimensions in the axial plane of the article for the domains in the polyester, at least some of the dimensions falling within a range of from about 400 nm to about 700 nm; blending a selected amount of light absorbent composition into the polyester to determine that the light absorbent composition absorbs light in a region of the visible spectrum such that X is less than 9.6 in the equation $$X=\Sigma(1-A_i)\times(N_i)$$

where $A_i$ is the percent of light absorbed at a wavelength i and $N_i$ is the number of domains per hundred square microns at wavelength i, and where i ranges from 400 nm to 700 nm; and adding that selected amount of the light absorbent composition to the polyester and the selected amount of incompatible filler and forming a different, transparent container into the same desired size and shape, thereby substantially masking any visual haze in the article.

Other aspects of the present invention may be still further achieved by a method for masking visual haze in a transparent article made from a major component of thermoplastic polymer and a minor component of at least one incompatible filler, comprising altering light absorption of the transparent article at wavelengths that at least substantially correlates with dimensions, in the axial plane of the article, of domains in the thermoplastic polymer created upon formation of the article and containing the incompatible filler.

DETAILED DESCRIPTION OF THE DRAWINGS

Figure 8A:
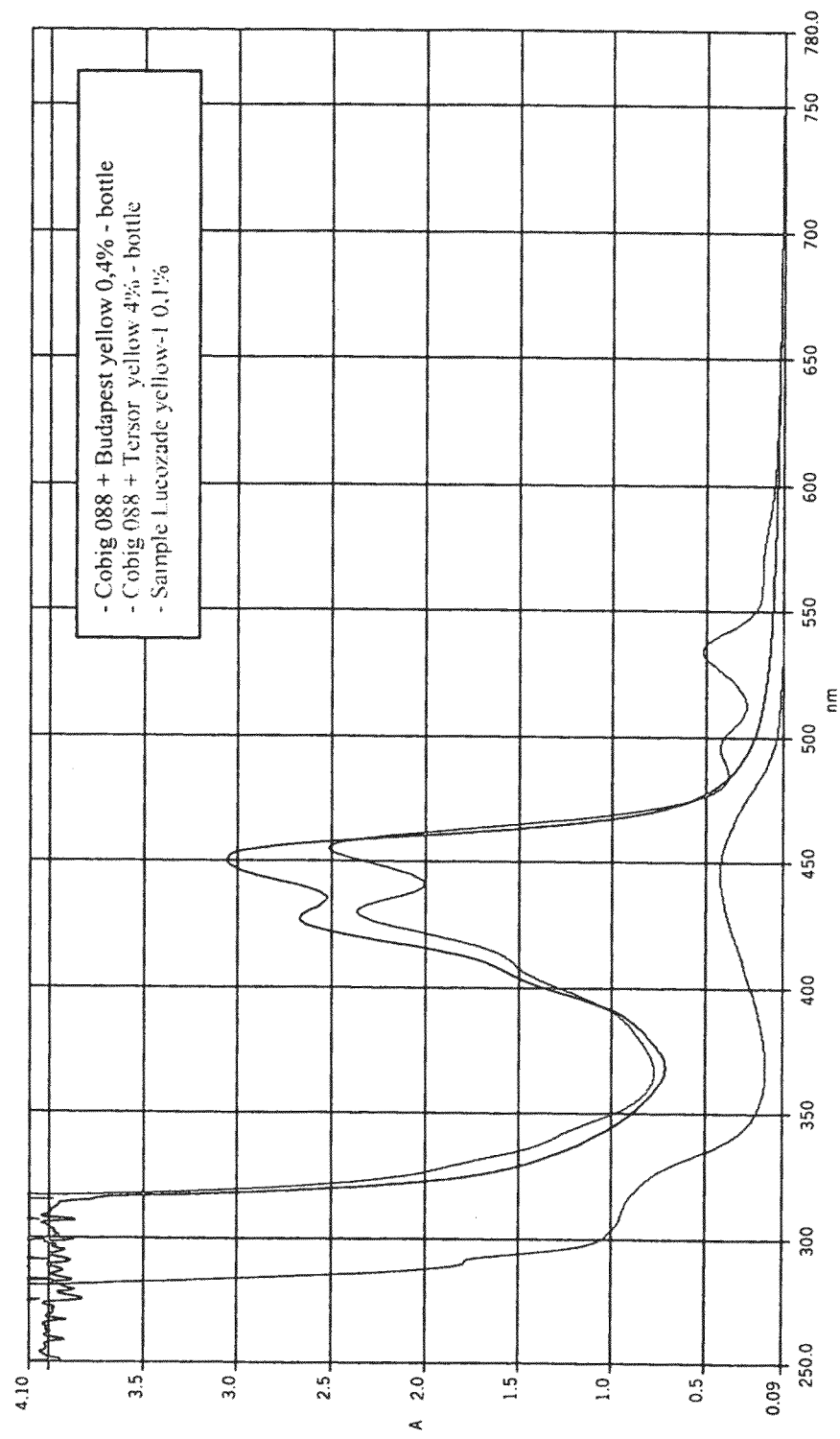
Figure 8B:
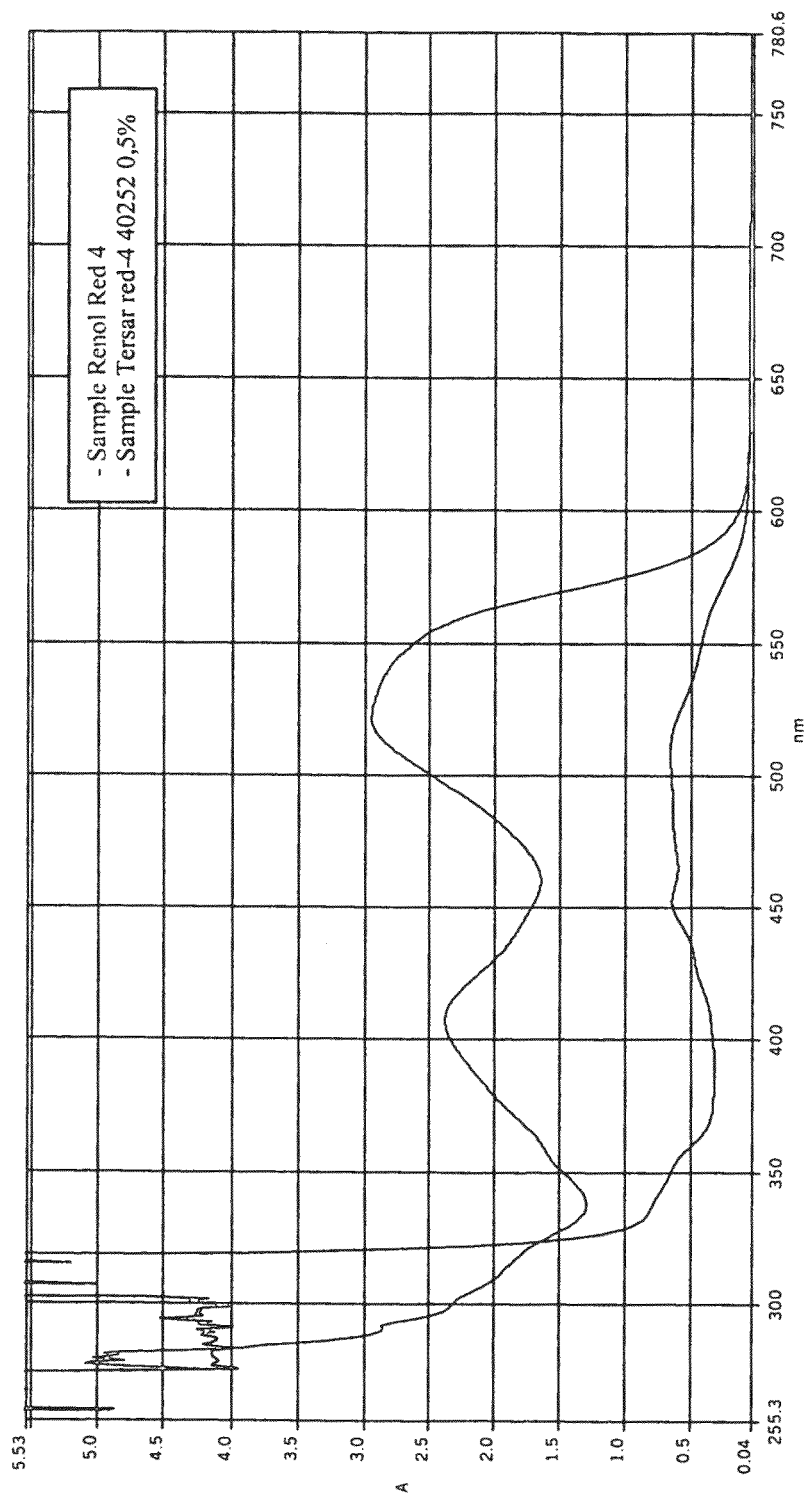
Figure 8C:
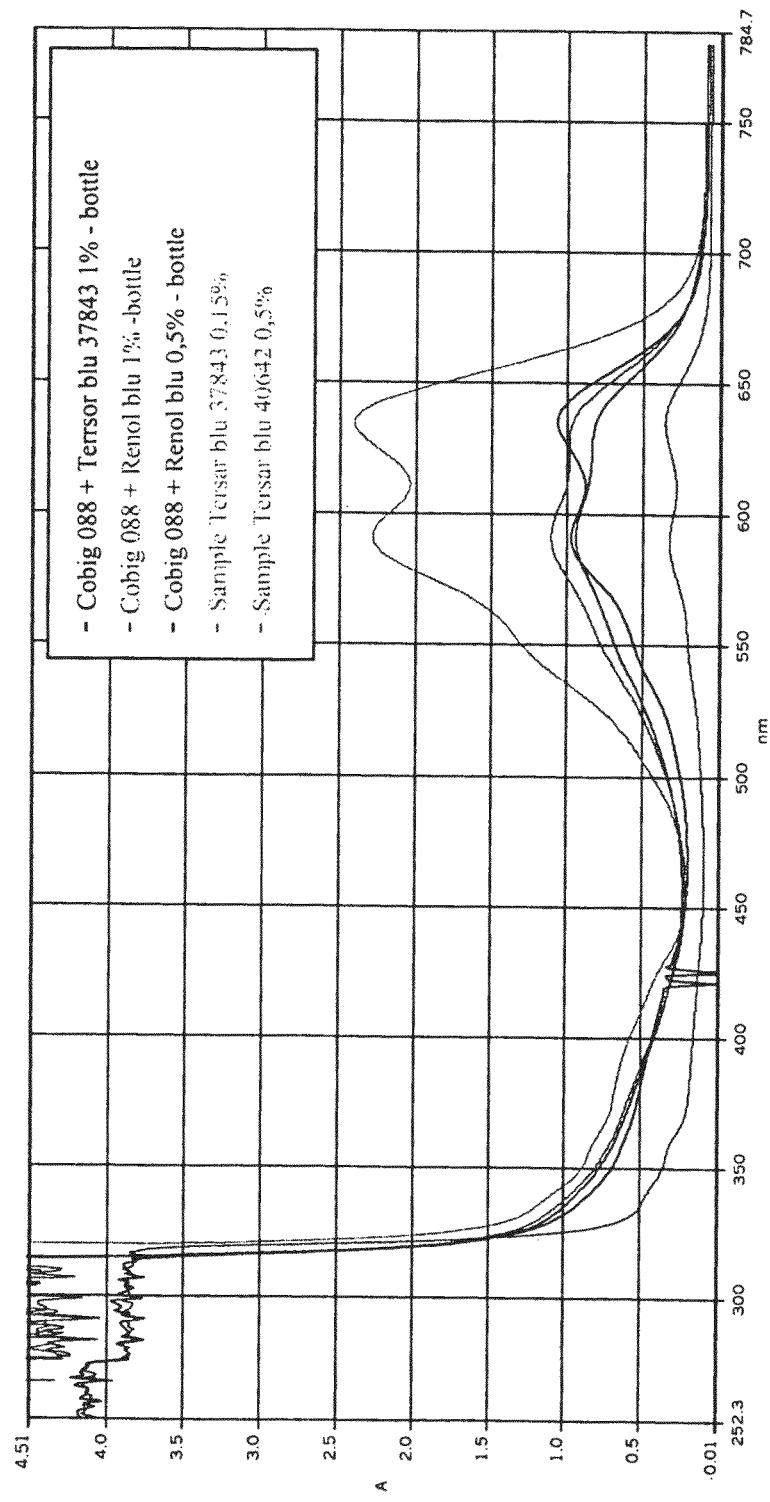
Figure 10:
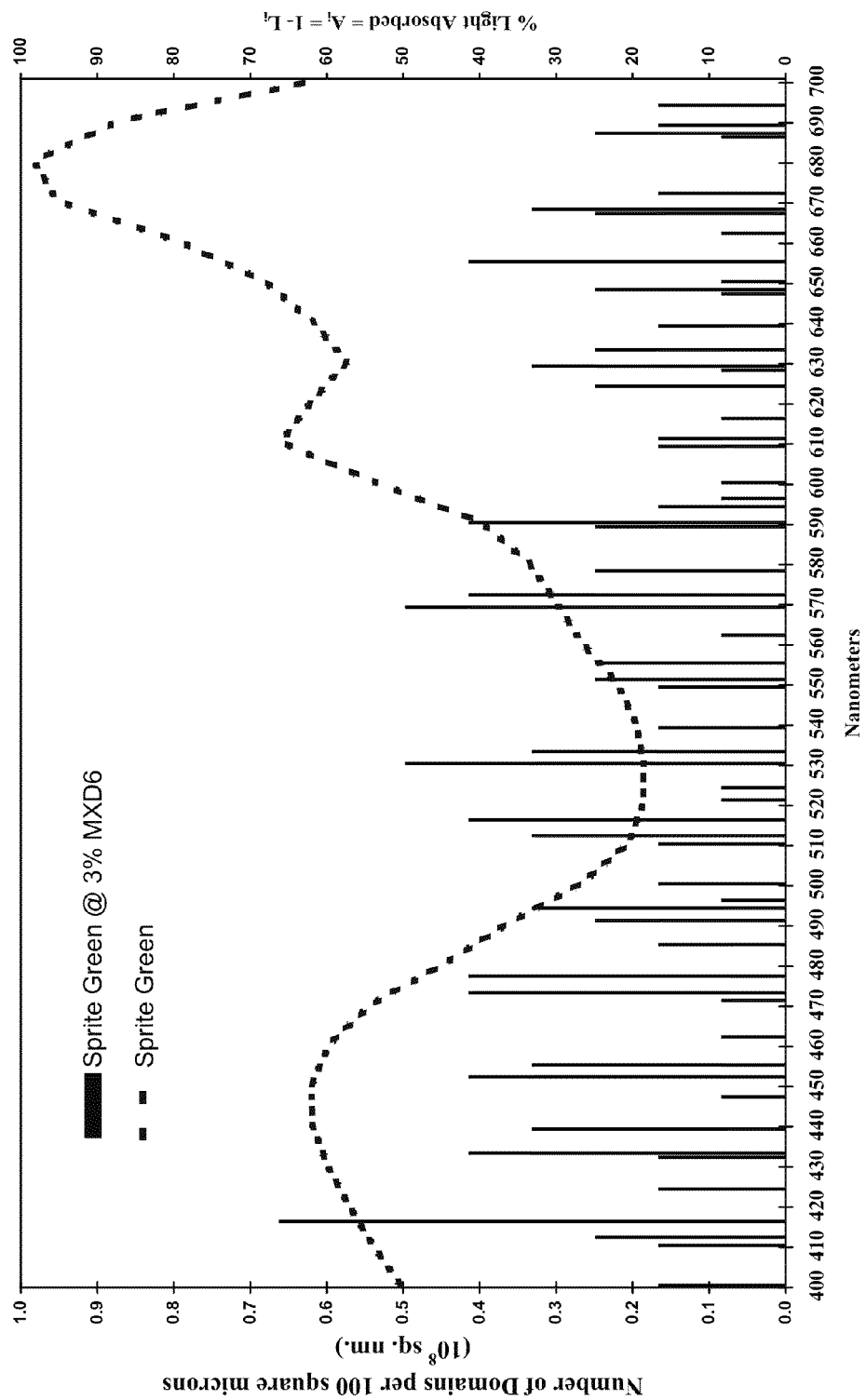
Figure 11:
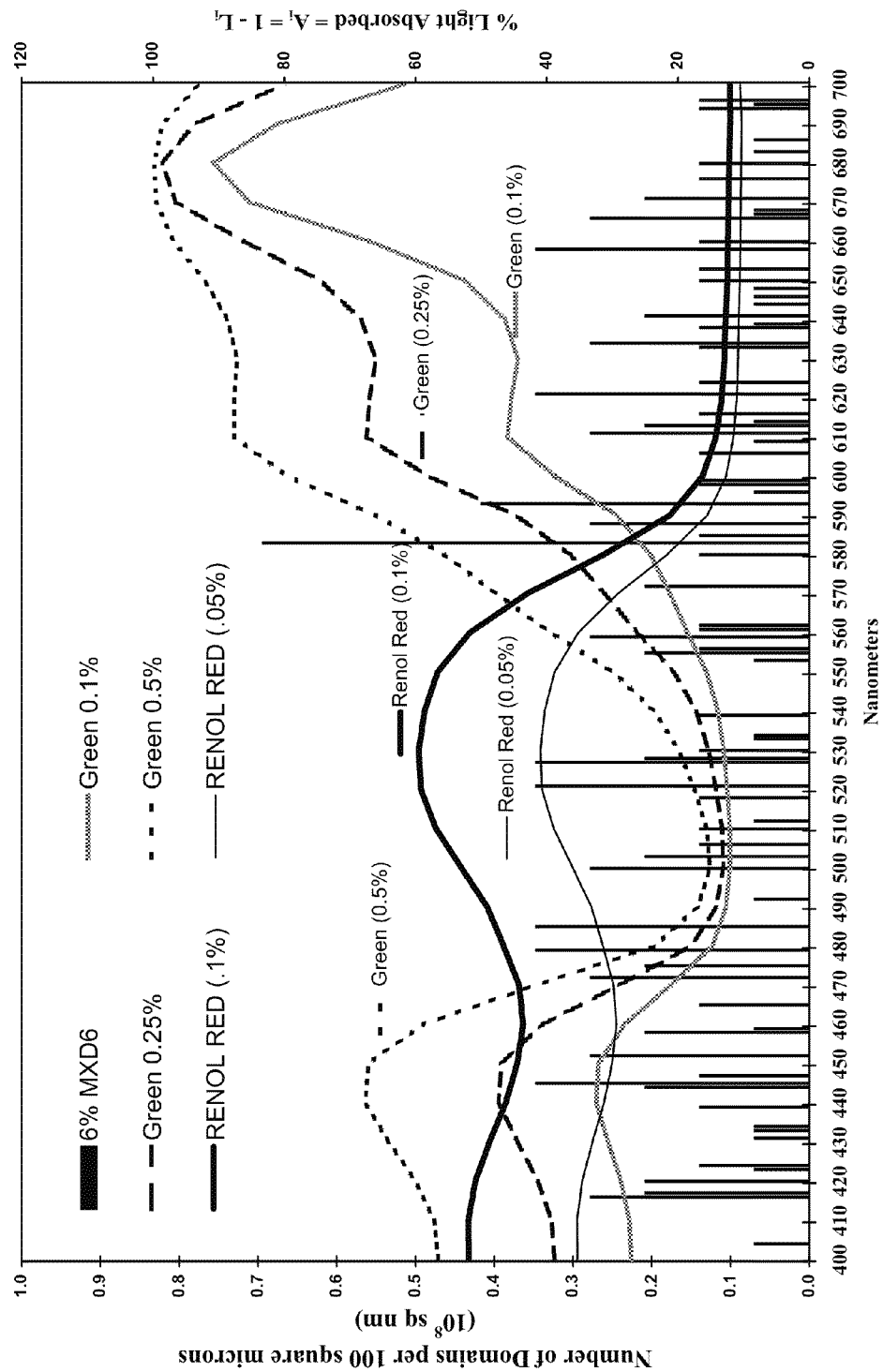
Figure 12:
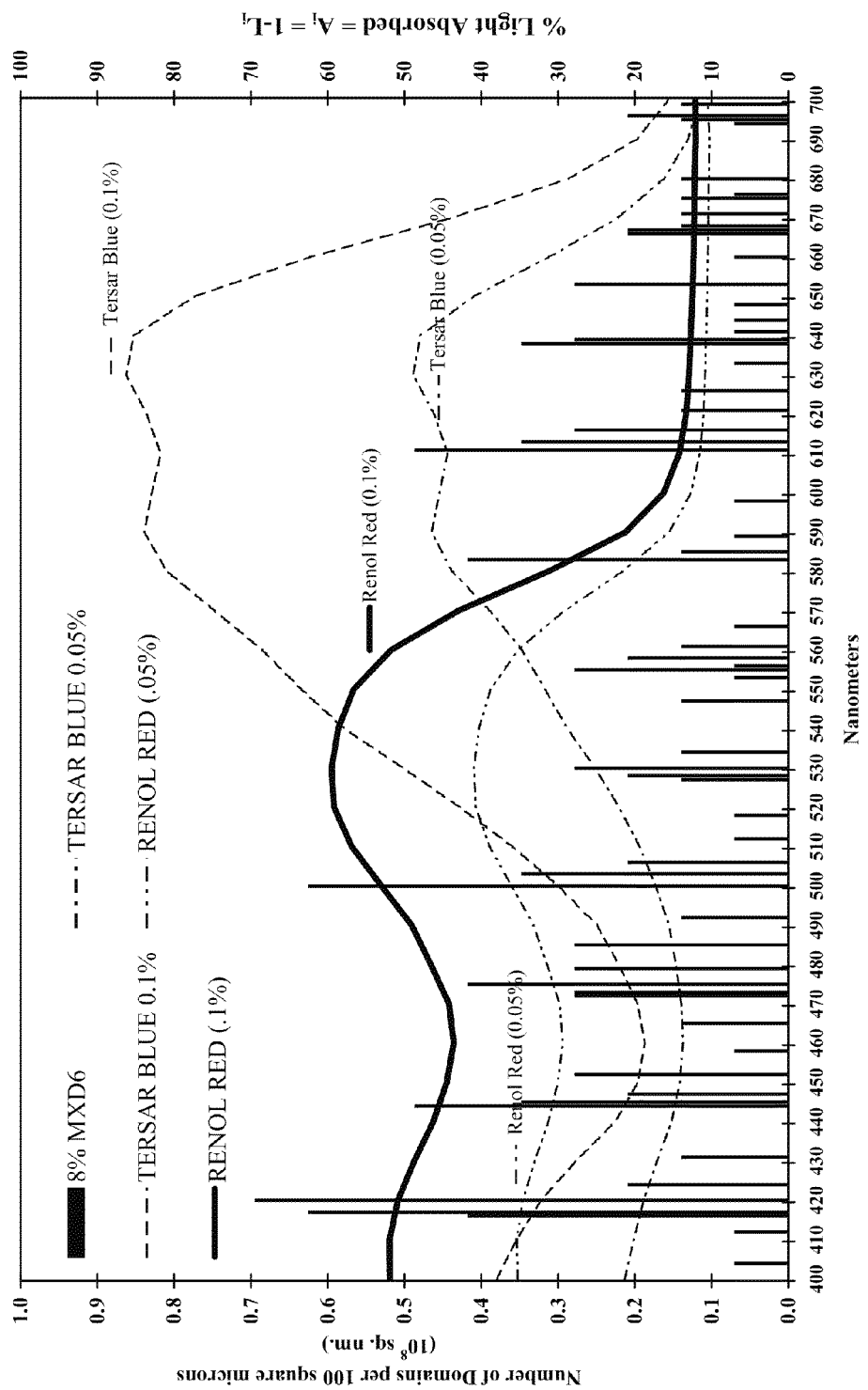

FIGS. 8A, 8B, and 8C are representative absorption spectra of various yellow, red, and blue colorants, respectively;

FIGS. 9A, 9B, 9C, and 9D are representative absorption spectra of various green, orange, purple and pink colorants, respectively;

FIG. 10 is a representative comparison graph comparing the plot of the number of domains per hundred square microns present in an article based upon its size in nanometers with the % of light absorbed of a particular green colorant designated Sprite Green, over that a range of wavelengths in nanometers for the same article;

FIG. 11 is a representative comparison graph comparing the plot of the number of domains per hundred square microns present in an article based upon its size in nanometers with the % light absorbed of various green and red colorants over a range of wavelengths in nanometers for the same article; and FIG. 12 is a representative comparison graph comparing the plot of the number of domains per hundred square microns present in an article based upon its size in nanometers with the % light absorbed of various blue and red colorants over a range of wavelengths in nanometers for the same article.

DETAILED DESCRIPTION OF THE INVENTION

In accordance with the present invention, shaped transparent articles comprising thermoplastic polymer and at least one incompatible filler dispersed therein are provided wherein haze in the article, normally visible to the naked eye of the ordinary observer, and produced most commonly by stretching or orienting the thermoplastic polymer and filler blend during production of the article, has been substantially masked. Such articles are especially useful in the packaging industry when in the form of a container or bottle.

The present invention solves the haze problem in a manner heretofore never contemplated. It masks haze that is visible to the naked eye of the observer of the article and does not require the use of low molecular weight fillers or fillers having domain dimensions in the article of less than about 200 nm or otherwise below the lowest wavelengths of the visible spectrum (i.e., less than about 380-400 nm), so as to produce an article having reduced physical haze below about 4% per 15 mil thickness of the article. Instead, the present invention masks any visible haze by altering the light absorption of the article at wavelengths that at least substantially covers the range of the dimensions of the filler domains in the axial plane of the article.

By the phrase "at least substantially covers" and the phrase "at least substantially correlates" also used herein, both of which can be used interchangeably, it is meant that the range of wavelengths, in nanometers, at which the light absorbent composition employed absorbs light in the visible spectrum is approximate to or is greater than the range of dimensions of the filler domains in the axial plane of the article, to the extent that those dimensions are somewhere between about 400 nm and about 700 nm, i.e., are in the visible spectrum. Thus, it will be appreciated that the range of dimensions of the filler domains does not have to completely cover the entire visible spectrum. It will also be appreciated that the range of wavelengths need not necessarily cover the entire range of dimensions of the filler domains provided in the article to mask the haze, but rather that they cover enough of the range of dimensions to substantially mask the haze. For instance, it is possible that the range of dimensions of the filler domains provided in the article is greater than or at least partially falls outside of the visible range. The range of wavelengths of the light absorbent composition need only substantially cover that range of dimensions that falls within the visible spectrum for the present invention. In another instance, if a light absorbent composition is capable of absorbing light in all but a very small region where only a few domains exist, it has been determined that the observer would not be able to see the haze of the container or bottle regardless of the fact that the light at a particular wavelength is not absorbed where a few domains may exist. That is, the remaining existence of a few particular domains having dimensions that do not correspond (i.e., fall outside the range of) to light absorbing wavelengths of the light absorbent composition employed is seen as de minimus to the present invention, and will not prevent substantial masking of the visual haze in the article. For practical purposes, masking of the visual haze will be deemed sufficient if the cosmetic appearance of the article having substantially masked haze is acceptable to the interested industry, in particular the container and bottling industry, as a transparent article that can be practically used in commerce.

In further defining the phrases "at least substantially covers" and "at least substantially correlates" above, it will also be appreciated that the greater the number of domains having a particular dimension in the axial plane of the article, desirably the greater the light absorption at the matching wavelength should be. However, it has been found that there need not necessarily be a one to one or greater correspondence between the intensity (i.e., amount) of the absorption for the light absorbent composition and the number of domains having a particular dimension. If substantial light is absorbed by the light absorbent composition at a wavelength that correlates to a particular dimension for a domain in the article, then it is believed that at least significant masking of the haze will occur.

More particularly, it has been found that a light absorbent composition that absorbs light in the visible spectrum such that X is less than 9.6 in the equation $$X = \Sigma(1-A_i) \times (N_i)$$

where $A_i$ is the percent of light absorbed at a wavelength i and $N_i$ is the number of domains per hundred square microns ($10^8$ $nm^2$) at wavelength i, and where i ranges from 400 nm to 700 nm (i.e., the visible spectrum), is considered to substantially cover the domains and will at least start reducing the visual haze of an article.

Stated another way, to reduce visual haze of an article, a light absorbent composition must be included in the relevant part of an article, typically the single continuous portion of the article where haze is noticed such as the sidewall of a container or bottle. That light absorbent composition must be capable of absorbing light in the visible spectrum of that single, continuous portion of the article such that, when absorbance is determined on that single continuous portion of the article without an incompatible filler present, X is less than 9.6 in the equation $$X = \Sigma(L_i) \times (N_i)$$

where $L_i$ is the percent of light not absorbed (i.e. that is available to reflect) at a wavelength i, and $N_i$ is the number of domains per hundred square microns ($10^8$ $nm^2$) at wavelength i, and where i ranges from 400 nm to 700 nm (i.e., the visible spectrum) If X is less than 9.6, then the ordinary observer will at least begin to see a reduction in the visual haze of the article.

Moreover, as X gets smaller, the visual haze of the article will be further reduced. Thus, while X must be less than 9.6 in the above equation for a reduction in visual haze to start to be noticed, X less than 9.5 is preferred, and X less than 9 is more preferred, and X less than 7.5 is even more preferred. It will be appreciated that where no domains are present (i.e., N=0), X will necessarily be 0, and no haze will be encountered. Likewise, where the colorant or light absorbent composition has absorbed most of the light available for reflection over a range of wavelengths, then the percent of light transmitted or reflected is low (i.e., L approaches 0) and therefore, X will be low unless there is an unusually high number of domains of the same size as those wavelengths. In other words, the total amount of relative light available for reflectance (i.e., that is not absorbed) across the entire visible spectrum, from about 400 nm to about 700 nm, must be less than 9.6. The "total amount of relative light" is calculated as the sum of all the light at each wavelength between about 400 nm and about 700 nm with a greater amount of light required for each wavelength having domains at that wavelength. Thus, the relative amount of light required to be absorbed is weighted toward the number of domains present in the wavelength.

It will be appreciated that the determination of whether a light absorbent composition will absorb light for a particular article below an X threshold is relatively simple and can be determined without undue experimentation. $A_i$ is the percent of light absorbed by the article having the colorant without the incompatible filler at wavelength i; $L_i$ is the percent of light available to reflect at wavelength i, where i is 400 nm to 700 nm. These percentages can be calculated upon measuring the absorbance of the composition, it being understood that $A_i+L_i=1$. In most instances, $L_i$ will be 1 minus the percent absorbed, or the percent of light available for reflectance. These measurements can be obtained using the process described below. $N_i$ is the number of domains per hundred square microns at wavelength i, where i is 400 nm to 700 nm. N, can be measured by SEM and normalized to square microns.

The intensity of the light at wavelength i may be pertinent in some instances, and can be factored into the equation as $I_i$ as follows $$X=300\Sigma(L_i)\times(N_i)\times(I_i)$$

where $I_i$ is the intensity of a source of light at the wavelength divided by the total light between 400 nm to 700 nm. Where a spectrophotometer that measures the percent light is used, $I_i$ is 1/300 and, therefore, multiplying by 300 normalizes the light to a common standard.

In essence, it has been found that employing a higher concentration of light absorbent composition to the article may help to more fully mask the visible haze in the article where the light absorbent composition absorbs light at a particular wavelength less intensely than at other wavelengths and/or where a great number of domains exist at a particular dimension corresponding to that particular wavelength. It is believed that any required intensity of the light absorbed can be calculated or predetermined without undue experimentation based upon the concentration of the light absorbent composition, the thickness of the article and other known parameters and coefficients according to the law of Beer-Lambert-Bouguer.

Figure 1:
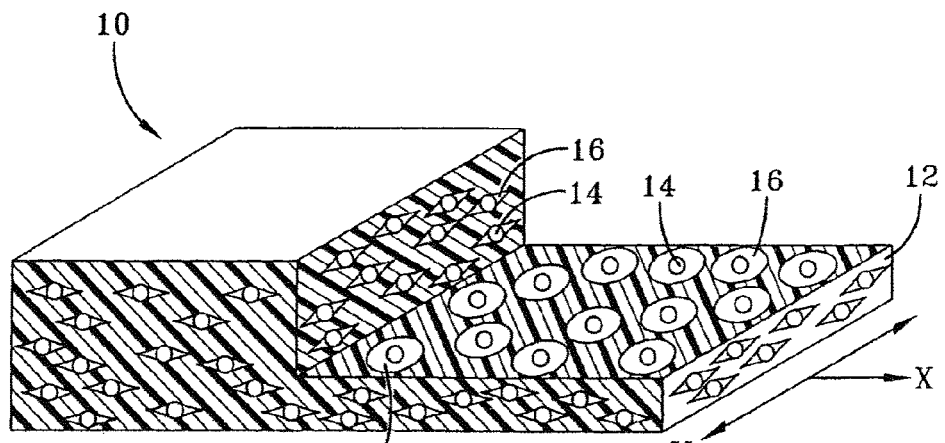
FIG. 1 is a representative sectional, perspective view of a part of an oriented article illustrating domains containing an incompatible filler dispersed within a thermoplastic polymer matrix.

Referring now to the drawings, a section of a shaped, transparent article, generally indicated by the numeral 10 in FIG. 1, is illustrated. As shown, the section 10 has been oriented or stretched in all directions within the axial plane of the article, including both the radial (X) and axial (Y) directions, as indicated by the arrows. By the term "axial plane," it is meant that the general plane of the article is essentially parallel to the surface of the article, or put another way, that the general plane of the article is substantially perpendicular to the line of sight of the observer.

The section 10 comprises a thermoplastic polymer matrix 12 having discrete particles 14 of an incompatible filler dispersed therein and, where the incompatible filler is not extensible or deformable like polyester and other thermoplastic polymers (e.g., clay particles), voids 16 encompass the particles 14. Assuming the use of spherical filler particles 14 upon blending in the polymer matrix 12, and where the particles have been dispersed uniformly and an article has been oriented evenly in all directions within the axial plane, a cross-section of the voids 16 would be, in theory, circular, as shown here and in FIG. 4, when viewed perpendicular to the axial plane. In practice however, dispersion of the filler and stretching of the article is not precise, and irregular-shaped voids are most often created, having various length, width and height dimensions.

It will be understood that the incompatible filler may be extensible and deformable like the thermoplastic polymer as well. Such fillers may themselves include various thermoplastic polymers, like polyamides. In the case of a polyester matrix, the incompatible filler would stretch like the polyester and form a stretched, discrete minor phase 17 within the polyester matrix. This phase 17 will essentially include not only the particles 14 but also the voids 16 in FIG. 1. Thus, the extensible filler will be stretched to fill-in all of the voids. In FIG. 1, the minor phase 17 of the filler will compass the entire circle identified by the numeral 16 as well as the circle therein identified by the numeral 14.

It is also known that, oftentimes, given the irregular shapes that may form, two or more of these discrete minor phases of the filler may come together to form one larger structure. For purposes of this invention, numerals 17 and 27 in FIGS. 1-4 will be referred to hereinafter as "the discrete phases" or "the minor phases" of the filler, unless otherwise stated, and shall include the area or volume denoted by both the numerals 16 and 14 in FIG. 1, and the numerals 26 and 24 in FIGS. 2-4, respectively. This language associates the present invention with the use of extensible thermoplastic polymers as the incompatible filler, but should not necessarily be limited in scope thereto, the present invention being set forth by the scope and spirit of the attached claims.

Unlike the representative drawing, sectioning the article along any one specific axial plane will penetrate the discrete minor phases 17 at various places through the height of each phase unless, as shown here, all minor phases 17 are evenly parallel on the specific axial plane. Thus, some discrete phases should appear smaller than others on any one specific axial plane. Likewise, cutting the article along any one specific transverse plane will penetrate the discrete phases at various places through the length and/or width of each discrete phase unless the phases are unidirectionally stacked on each other within that plane. Thus, some discrete phases should appear longer than others on any one specific axial plane.

Figure 2:
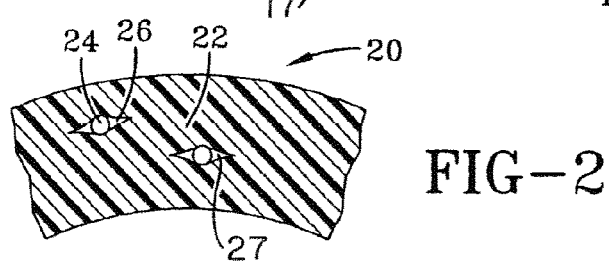
FIG. 2 is a representative cross-sectional view of a shaped, oriented article also illustrating domains containing an incompatible filler dispersed within a thermoplastic polymer matrix.

In FIG. 2, a section of a wall of a shaped article, generally indicated by the numeral 20, is illustrated. Such an article may be a plastic container or bottle. As described previously for FIG. 1 above, this section 20 of the article includes a thermoplastic polymer matrix 22 having discrete particles 24 of an incompatible filler dispersed therein and surrounded by voids 26. Based upon the FIGS. 3 and 4, it will be appreciated that this article 20 is also oriented or stretched in all directions within the axial plane of the article, in a manner similar to that shown in FIG. 1.

Figure 3:
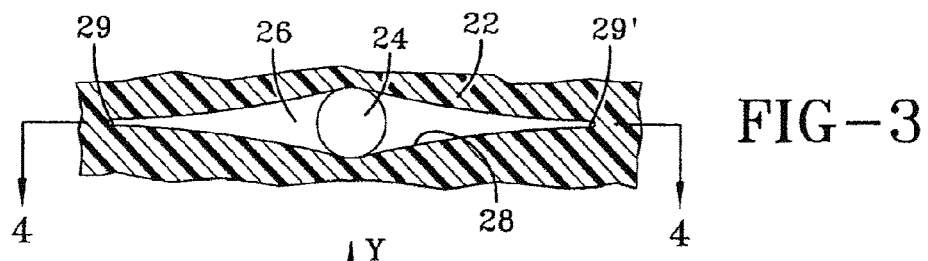
FIG. 3 is an enlarged sectional view of one domain within the thermoplastic polymer matrix of FIG. 2.
Figure 4:
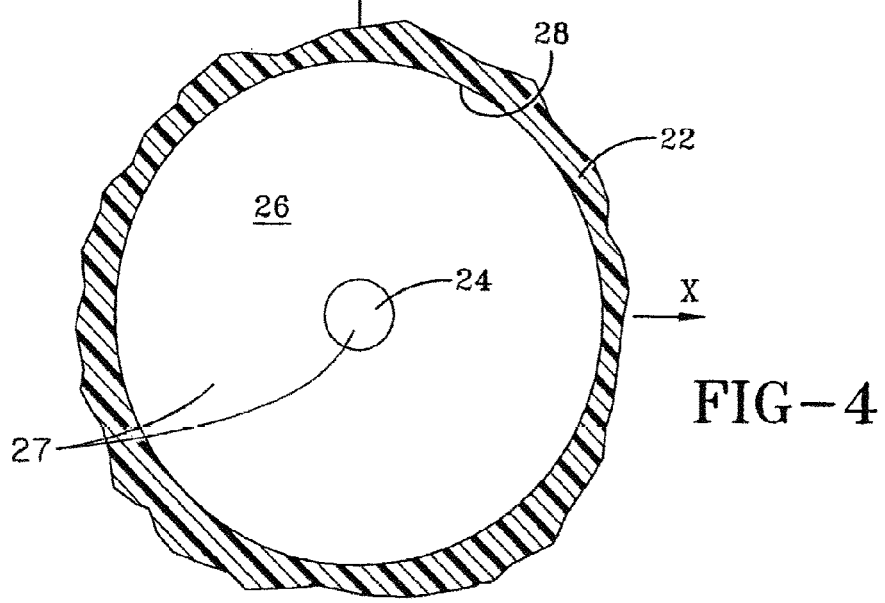
FIG. 4 is an enlarged sectional view of the domain of FIG. 3 taken along line 4-4 in FIG. 3.

FIGS. 3 and 4 are sectional views illustrating enlargement of a section of the shaped article of FIG. 2, wherein the filler particle 24 is contained in the void 26 and is entrapped within the continuous thermoplastic polymer matrix 22. Again, where the filler is an extensible, deformable thermoplastic polymer, the entire area or volume denoted by the numerals 24 and 26 is the minor phase 27 of the filler. These phases 27 result from the shaped article being stretched as discussed herein above.

Upon formation of the article, a domain 28 is created in the polymer matrix 22 which essentially includes both the discrete particle 24 and void 26, or the entire minor phase 27 of the incompatible filler. Where the incompatible filler used in the present invention is moldable and stretchable like the polymer employed in the article, orientation or stretching of the article will cause the incompatible filler, like the polymer, to spread along the axial plane of the article and to narrow in the transverse plane of the article as the wall of the article becomes thinner. However, in instances where the filler is not stretchable like the polymer, a void or voids 26 may be left between the filler and the polymer. Where a polyamide and another thermoplastic polymer other than the thermoplastic polymer employed as the matrix polymer, e.g., polyester, are utilized as the filler, the void left, if any, will generally be de minimus since both of the thermoplastic polymers are stretchable and deformable. Thus, the domains created in the matrix polymer are essentially the volume of the minor phases themselves. Nevertheless, for purposes of this invention, it will be understood that, where non-deformable filler particles are utilized, a domain 28 includes not only the volume of the filler particle 24, but also any additional volume in the article of any void 26 between the filler particle 24 and the polymer 22. Where the article has not been stretched, the domain will match the volume of the filler particle.

The present invention is particularly concerned with those domains having a dimension in the axial plane of the article within the range of from about 400 nm to 700 nm. Referring to FIGS. 3 and 4, the dimension of a domain is the diameter of the domain. Thus, in FIG. 3, the dimension can be seen as extending from one end 29 to the other end 29' of the domain. In FIG. 4, the dimension of the domain shown is any diameter of the circle. However, it will be appreciated that more often the domain in the axial plane of the article will be ellipsoidal in nature and will have a longer diameter in one direction, say the Y direction, than in another, say the X direction. In this instance, the dimensions of relevance may be the longest diameter of the domain (i.e., the major axis of the domain which, in this scenario, is in the axial Y direction), or the diameter of the dimension perpendicular to the longest diameter in the axial plane (i.e., the minor axis of the domain which is in the radial (X) direction). It has been found that domains having dimensions of between about 400 nm and about 700 nm show up in the article as visual haze. Not coincidentally, this range is also the range of the visible spectrum. Thus, any domain having a dimension falling within the range of the visible spectrum might be visible as haze.

It will also be understood that not all domains must necessarily have dimensions that fall within the range of the visible spectrum, but it is only those domains with which the present invention is concerned. In theory, if a sufficient number of domains having dimensions in the visible spectrum are found, then the container will have haze regardless of the number of domains that do not have dimensions falling within the visible spectrum.

Figure 5:
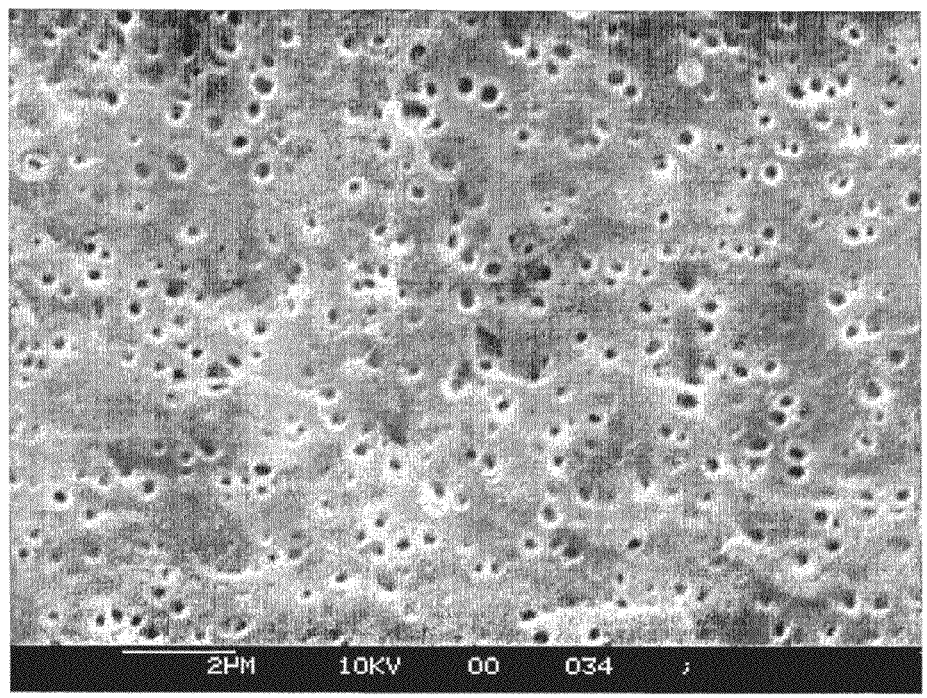
FIG. 5 is a photomicrograph of a portion of a transparent article prior to orientation.
Figure 6:
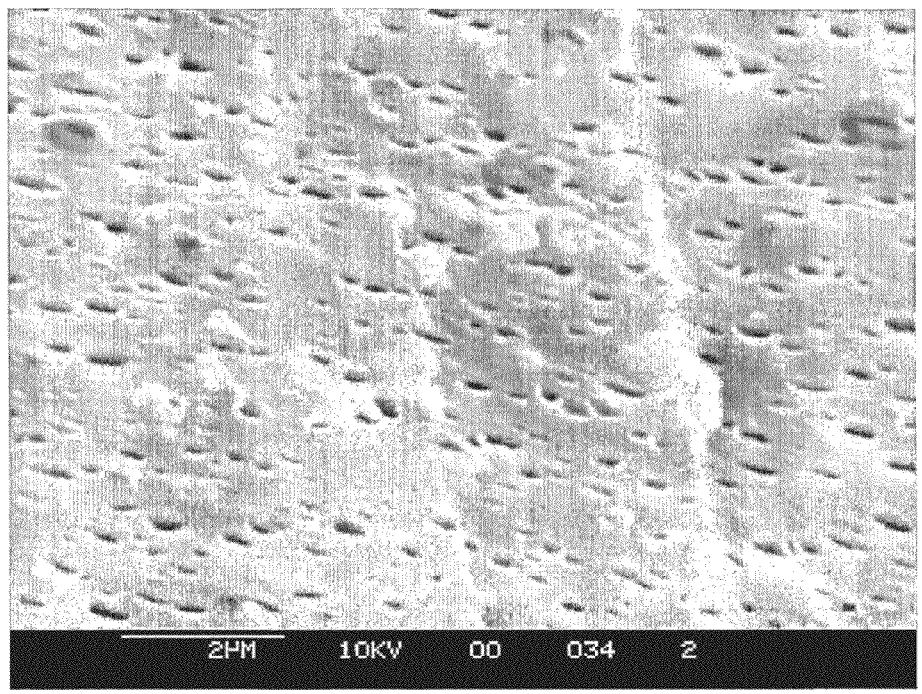
FIG. 6 is a photomicrograph of the same portion of the transparent article of FIG. 5 after orientation to a desired shape and size.

Referring to FIGS. 5 and 6, photomicrographs of a transparent article before (preform) and after orientation (container), respectively, show that the domains created in a polyester during formation, and here, orientation, of the article, and containing the incompatible filler, indeed increase in size upon orientation. In the transparent, non-hazy preform, the domains are on the order of about 200 nm or less, well below the visible spectrum. However, in FIG. 6, the stretching process during orientation of the container has increased the size of the domains. As shown, the length dimensions of the domains are well within the visible spectrum.

Also, the domains does not have to cover the entire visible spectrum. The domains' dimensions may comprise a range that extends into the region of the visible spectrum, i.e., the range of dimensions exceeds 400 nm or starts below 700 nm, or may fall only within a particular range within the region of the visible spectrum, e.g., range from about 450 nm to about 580 nm.

Once the range of dimensions of the filler domains is determined or otherwise found, a light absorbent composition can be found which absorbs light at wavelengths in the region of the visible spectrum that at least substantially covers the range of dimensions of the domains or, stated another way, that provides for X being less than 9.6 in the equation $$X = \Sigma(1-A_i) \times (N_i)$$

where $A_i$ is the percent of light absorbed at a wavelength i and $N_i$ is the number of domains per hundred square microns ($10^8$ $nm^2$) at wavelength i, and where i ranges from 400 to 700. However, determining the range of dimensions of the filler domains does not have to be done experimentally or by measurement. All that is required is that it be determined that a substantial number of domains have dimensions falling within the visible spectrum, i.e., from about 400 nm to about 700 nm. This can be as simple as determining that the container or other article has physical haze that is visible to the naked eye. It is believed that if the article has "visual haze," it necessarily has domains having dimensions falling in the region of the visible spectrum.

The light absorption of the light absorbent composition is often known to those skilled in the art, and may be found or determined by any manner known in the art. One method for determining the light absorption of a light absorbent composition is to analyze the absorption spectra of the composition. Once the region of absorption for that spectrum of the composition is known, that spectrum can be considered in view of the range of dimensions of the filler domains present, and/or can be used to calculate the percent of light available for reflecting at any of a selected wavelength. If the light absorption spectrum at least substantially covers the range of dimensions, or if X is less than 9.6, more preferably less than 9.5, even more preferably less than 9 and most preferably less than 7.5, then the composition can be used in the article. When the article is oriented or stretched, it has been unexpectedly found that the composition in the article absorbs light in a manner that substantially masks the haze of the article.

Turning to the components of the article, the present invention includes a thermoplastic polymer matrix having an incompatible filler dispersed therein. The incompatible filler is preferably present in an amount of about 0.5 to about 50 percent by weight based on the weight of polymer. In one embodiment, a polyester, preferably PET, may comprise from about 99.5 to about 50 percent by weight of the article as the major component and the incompatible filler, preferably MXD-6, may comprise from about 0.5 to about 50 percent by weight of the article as the minor component.

It will be understood that the thermoplastic polymer suitable for use in the present invention can be made into a film or sheet. The present invention is not, however, limited to films and sheets. The article of the present invention also includes containers, bottles, trays, bases, lids, etc. Such article may be manufactured or formed into a desired size and shape using any processing techniques known in the art, including blow molding, injection molding, extrusion, and the like. Articles of the present invention may also include a wall of a larger article. Moreover, the article of the present invention is desirably transparent. By "transparent," it is meant that one can see through the article, i.e. is not opaque. It will be understood that the transparent article may be colored, but that one can clearly see through at least one wall or sheet of the article.

The major component of the article of the present invention is the thermoplastic polymer matrix. Suitable thermoplastic polymers for use in the present invention include any thermoplastic homopolymer, copolymer, terpolymer, or blend. Examples of thermoplastic polymers include polyamides, such as nylon 6, nylon 66 and nylon 612, linear polyesters, such as polyethylene terephthalate, polybutylene terephthalate, polytrimethylene terephthalate, polyethylene isophthalate, and polyethylene naphthalate, branched polyesters, polystyrenes, polycarbonate, polyvinyl chloride, polyvinylidene dichloride, polyacrylamide, polyacrylonitrile, polyvinyl acetate, polyacrylic acid, polyvinyl methyl ether, ethylene vinyl acetate copolymer, poly(3-phenyl-1-propene), poly(vinylcyclohexane), ethylene methyl acrylate copolymer, and low molecular weight polyolefins having 2 to 20 carbon atoms, such as polyethylene, polypropylene, ethylene-propylene copolymers, poly(1-hexene), poly(4-methyl-1-pentene), poly(1-butene), and poly(3-methyl-1-butene). Preferably, the thermoplastic polymer used in the present invention comprises a polyester polymer or copolymer.

The polyester phase may be any article-forming polyester or copolyester such as a polyester capable of being cast, extruded or molded into an article. The polyesters should have a glass transition temperature between about 50° C. and about 150° C., preferably about 60°-100° C., should preferably be orientable, and have an I.V. of at least 0.55, preferably 0.6 to 1.0 deciliters/gram, as determined by ASTM D-4603-86 at 30° C. in a 60/40 by weight mixture of phenol and tetrachloroethane. Suitable polyesters include those produced from aromatic, aliphatic or cycloaliphatic dicarboxylic acids of from 4 to about 40 carbon atoms and aliphatic or alicyclic glycols having from 2 to about 24 carbon atoms.

Polyesters employed in the present invention can be prepared by conventional polymerization procedures well known in the art. The polyester polymers and copolymers may be prepared, for example, by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. The diversity of the repeat units depends on the number of different types of monomers present in the initial polymerization reaction. In the case of polyesters, copolymers include reacting one or more diols with a diacid or multiple diacids, and are sometimes referred to as terpolymers.

As noted herein above, suitable dicarboxylic acids include those comprising from about 4 to about 40 carbon atoms. Specific dicarboxylic acids include, but are not limited to, terephthalic acid, isophthalic acid, naphthalene 2,6-dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalic diesters.

These acids or esters may be reacted with an aliphatic diol preferably having from about 2 to about 24 carbon atoms, a cycloaliphatic diol having from about 7 to about 24 carbon atoms, an aromatic diol having from about 6 to about 24 carbon atoms, or a glycol ether having from 4 to 24 carbon atoms. Suitable diols include, but are not limited to, 1,4-butenediol, trimethylene glycol, 1,6-hexanediol, 1,4-cyclohexanedimethanol, diethylene glycol, resorcinol, and hydroquinone.

Polyfunctional comonomers can also be used, typically in amounts of from about 0.1 to about 3 mole percent. Suitable comonomers include, but are not limited to, trimellitic anhydride, trimethylopropane, pyromellitic dianhydride (PMDA), and pentaerythritol. Polyester-forming polyacids or polyols can also be used. Blends of polyesters and copolyesters may also be useful in the present invention.

One preferred polyester is polyethylene terephthalate (PET) formed from the approximate 1:1 stoichiometric reaction of terephthalic acid, or its ester, with ethylene glycol. Another preferred polyester is polyethylene naphthalate (PEN) formed from the approximate 1:1 to 1:1.6 stoichiometric reaction of naphthalene dicarboxylic acid, or its ester, with ethylene glycol. Yet another preferred polyester is polybutylene terephthalate (PBT). Copolymers of PET, copolymers of PEN, and copolymers of PBT are also preferred. Specific copolymers and terpolymers of interest are PET with combinations of isophthalic acid or its diester, 2,6 naphthalic acid or its diester, and/or cyclohexane dimethanol.

The esterification or polycondensation reaction of the carboxylic acid or ester with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred. Another preferred polyester is polytrimethylene terephthalate (PTT). It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. Aromatic and aliphatic acids which may be used simultaneously to make a copolymer include, for example, isophthalic acid and sebacic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis(acetylacetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

The polymer of this invention may also contain small amounts of phosphorous compounds, such as phosphates, and a catalyst such as a cobalt compound, that tends to impart a blue hue. Also, small amounts of other polymers such as polyolefins can be tolerated in the continuous matrix.

The melt phase polymerization described above may be followed by a crystallization step, then a solid phase polymerization (SSP) step to achieve the intrinsic viscosity necessary for the manufacture of certain articles such as bottles.

The crystallization and polymerization can be performed in a tumbler dryer reaction in a batch-type system. Alternatively, the crystallization and polymerization can be accomplished in a continuous solid state process whereby the polymer flows from one vessel to another after its predetermined treatment in each vessel. The crystallization conditions preferably include a temperature of from about 100° C. to about 150° C. The solid phase polymerization conditions preferably include a temperature of from about 200° C. to about 232° C., and more preferably from about 215° C. to about 232° C. The solid phase polymerization may be carried out for a time sufficient to raise the intrinsic viscosity to the desired level, which will depend upon the application. For a typical bottle application, the preferred intrinsic viscosity is from about 0.65 to about 1.0 deciliter/gram, as determined by ASTM D-4603-86 at 30° C. in a 60/40 by weight mixture of phenol and tetrachloroethane. The time required to reach this viscosity may range from about 8 to about 21 hours. In one embodiment of the invention, the article-forming polyester of the present invention may comprise recycled polyester or materials derived from recycled polyester, such as polyester monomers, catalysts, and oligomers.

Suitable fillers for the present invention include, but are not necessarily limited to, those polymers, clays, minerals, and other compounds known to be chemically unreactive with the thermoplastic polymer matrix so as to provide discrete domains within the polymer matrix. Typically, such fillers will be provided in order to improve a physical or mechanical property of the polyester for a desired purpose. For example, in many food and beverage packaging applications, reducing gas permeability of the container or bottle in which the food or beverage is stored is often desired. Thus, gas barrier strengthening fillers are added to improve the container's ability to prevent oxygen or other gases from passing through the container wall and into the container or bottle, thereby possibly spoiling the food or beverage inside.

The incompatible fillers of the present invention are on the order of from about 10 nanometers to less than about 1 micron in diameter. While there are many larger particles which may increase the gas barrier strengthening properties of the container or bottle, the present invention refers to those particle fillers which create domains having dimensions of from about 10 nanometers up to about 1 micron, and which, more particularly, create domains having dimensions of from about 400 nanometers to about 700 nanometers. Thus, fillers having particle sizes higher or lower than the about 400 to about 700 nanometer range may be employed so long as at least some of the domains created upon orientation fall within that range, even if other domains are created that fall outside of that range.

The most preferred incompatible fillers are polyamides. Suitable polyamides include aliphatic, cycloaliphatic and aromatic polyamides. As noted above, the amount of polyamide to be blended with the polyester is preferably from about 0.5 to about 50 weight percent, more preferably from about 3 to about 15 weight percent. Also preferred incompatible fillers are nanoclays, glass beads, and fibers.

Where a polyamide is employed as the incompatible filler, the polyamide component of the present invention may be represented by repeating unit A-D, where A is the residue of a dicarboxylic acid including adipic acid, isophthalic acid, terephthalic acid, 1,4-cyclohexanedicarboxyolic acid, resorcinol dicarboxylic acid, naphthalene-2,6-dicarboxylic acid or a mixture thereof, and D is the residue of a diamine including m-xylylene diamine, p-xylylene diamine, hexamethylene diamine, ethylene diamine, 1,4-cyclohexanedimethylamine or a mixture thereof. Preferred polyamides that can be used in this invention includes poly(m-xylylene adipamide) or a copolymer thereof, isophthalic or terephthalic acid-modified poly(m-xylylene adipamide), nylon 6, nylon 6,6 or a mixture thereof, poly(hexamethylene isophthalamide), poly(hexamethylene adipamide-co-isophthalamide), poly(hexamethylene adipamide-co-isophthalamide, poly(hexamethylene adipamide-co-terephthalamide) or poly(hexamethylene isophthalamide-co-terephthalamide).

Suitable polyamides may also contain small amounts of trifunctional or tetrafunctional comonomers including trimellitic anhydride, pyromellitic dianhydride or other polyamide forming polyacids and polyamines known in the art.

The I.V. for the polyamides to be blended with the polyester is preferably less than about 1.0 deciliters/gram, and most preferably less than about 0.7 deciliters/gram as determined by ASTM D-4603-86 at 25° C. in a 60/40 by weight mixture of phenol and tetrachloroethane at a concentration of 0.5 g/100 ml (solvent).

The preparation of polyamides and polyester/polyamide blend compositions is well known in the art and any methods for obtaining these compositions may be employed.

In one embodiment of the present invention, the preferred polyamide is poly(m-xylylene adipamide), also often referred to as MXD-6. MXD-6 is preferably used in an amount ranging from about 1 to about 30 percent by weight relative to the polyester resin. Also preferred are other MXDs, wherein all or part of the units derived from adipic acid are replaced by units derived from dicarboxylic acid with 6 to 24 carbon atoms other than adipic acid, such as for example, sebacic, azelaic, and dodecanoic acid, may be employed.

The invention does not require but may include the use or addition of any of a plurality of organic or inorganic materials, such as but not limited to, anti-blocks, anti-stats, plasticizers, stabilizers nucleating agents, etc. These materials may be incorporated into the polymer matrix, into the dispersed minor phase, or may exist as separate dispersed phases.

Mixing or blending of a polyester resin and polyxylylene amide may be carried out in an extruder under known conditions of temperature and shear forces so as to ensure proper mixing and to create a fine, stable dispersion of the polyamide in the polyester matrix. In one embodiment, the polyester and filler of the present invention is generally prepared using a well known technique known as the "shake and bake" method. Typically, polyester, such as PET, and polyamide polymers, as well as the light absorbent composition when it is time, are mixed into a masterbatch, shaken until thoroughly mixed and poured into the hopper to be extruded or molded into preforms as is well known in the art. Shear rates higher than $100\ s^{-1}$ may be used when melt-mixing polyamide. The melt viscosity ratio of the polyester to the polyxylylene amide, elevated at 280° C. at a shear rate of $100\ s^{-1}$, is preferably between about 3:1 and 8:1.

Once blended, the blended components may then be made into a desired size and shape of an article. In one embodiment, the component can be blow molded into the shape of a bottle or other container of a particular size. Once molded, a determination that at least some of the filler domains in the article have dimensions in the axial plane of the container of from about 400 nm to about 700 nm can be made. Such a determination may be made simply by determining that the article has haze visible to the naked eye. In one embodiment, where a more precise determination is desired, the minor phase of the thermoplastic polymer filler can be dissolved out of the polyester matrix by using formic acid. Use of cold formic acid, i.e., formic acid at room temperature, is preferred. As the temperature of hot formic acid is above the Tg of polyester, it is possible that the domains could be relaxed or expanded depending upon the location of the domains. Once dissolved, a measurement of the domain dimensions can be taken as may be known in the art. For example, one method of measuring the domain dimensions is to obtain a scanning electron microscope (SEM) photomicrograph of the article and measure the domain using appropriate equipment and techniques such as by using LuciaM (available from Laboratory Imaging, Prague, Czech Republic) software on the photomicrographs realized at 5000×. It will be appreciated that, however, that the dimensions measured may not all be the longest dimensions for any one domain, although theoretically they should be. In one embodiment, measurements were taken of both the preforms and the container in both the radial and axial directions in the axial plane of the container.

Once it is determined that the range of dimensions in the axial plane of the container for the domains created in the polymer matrix after forming the container includes at least some of the dimensions falling within a range of from about 400 nm to about 700 nm, a light absorbent composition can be found that absorbs light in a region of the visible spectrum at wavelengths that at least substantially covers the range of dimensions of the domains in the container. As noted above, this can be done by any means known in the art, including experimentally by adding various compositions to a similarly blown container, experimentally by providing sleeves of colored films over the article, by review of the spectrum of the various light absorbent compositions proposed to be used, or by determining whether X in the equation $$X = \Sigma (1 - A_i) \times (N_i)$$

where $A_i$ is the percent of light absorbed at a wavelength i and $N_i$ is the number of domains per hundred square microns ($10^8$ $nm^2$) at wavelength i, and where i ranges from 400 nm to 700 nm (i.e., the visible spectrum), is less than 9.6, preferably less than 9.5, more preferably less than 9, and most preferably less than 7.5.

Preferably, these compositions will be colorants commonly used in pigmenting or dying of plastics. Essentially any colorant (either a dye or a pigment) may be employed provided it has a suitable spectrum as required for the present invention. The colorant may or may not be compatible with (i.e., hydrophilic to) the polyamide or other filler employed.

The colorant can be mixed into the polyester/filler matrix or, alternatively, can be made of a separate film overlaying the article showing visible haze. Known multi-layering techniques can be used to adhere the layers together. Generally, however, the light absorbent composition may be in a separate film overlaying a separate layer of the article comprising the polyester/filler matrix.

Thus, in a multilayer container, at least one layer of the multi-layer container may comprise the thermoplastic matrix with the dispersed incompatible filler and another, different layer may comprise the light absorbent composition.

It is also possible that the light absorbent composition can come from the polyester itself. If the range of dimensions for the domains is such that yellowing of the polyester can provide light absorption in a range that substantially covers that range of dimensions of the domains, no additional composition will be necessarily required. Hence, the yellowing component of the polyester itself may serve as the light absorbent composition.

Alternatively, and as noted above, an effective amount of the light absorbent composition may be added to the thermoplastic polymer and the incompatible filler blend in any manner known in the art. Another container may then be made using known container-making techniques such as blow molding. This new transparent container having a polyester matrix with an incompatible filler and a light absorbent composition dispersed therein should then be made into the same desired size and shape. A different size and shape may provide different dimensions to the domains found in the article and could change the range of the dimensions and thus, the light absorbent composition required. It should then be evident that the light absorbent composition can substantially mask the haze in the container.

Figure 7:
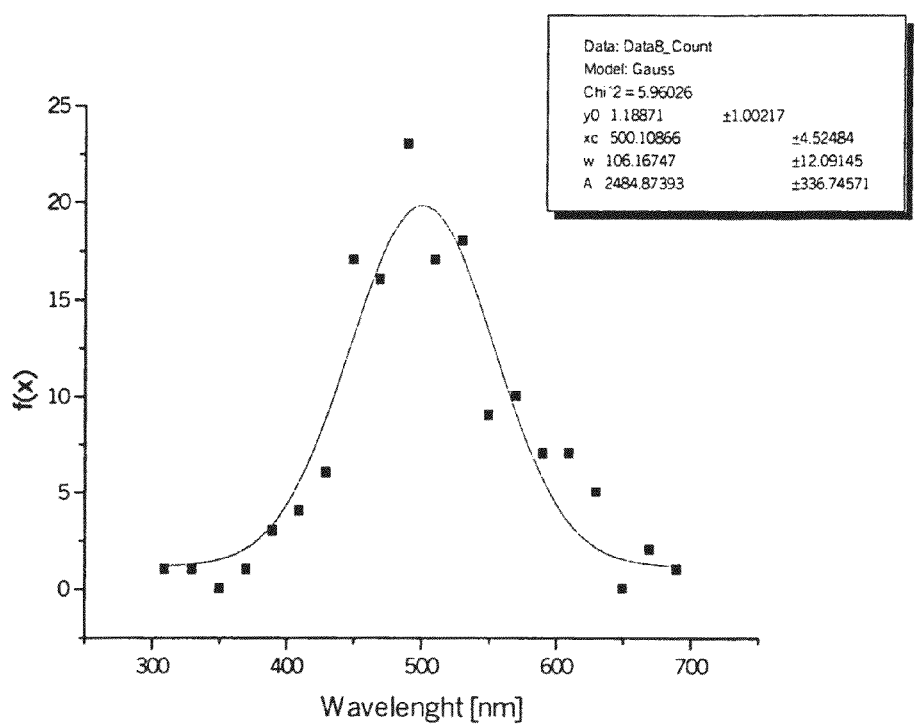
FIG. 7 is a representative graph of the data obtained from analysis of the dimensions of the MXD-6 domains of a 500 ml bottle prepared from polyester and MXD-6.

In order to demonstrate practice of the present invention, a number of preforms were extruded from a blend of polyester, namely polyethylene terephthalate (PET) and about 5 percent by weight polyamide, namely, poly(-xylylene adipamide), commonly known as MXD-6 and available from Mitsubishi Gas Chemical (Harada, M., *Plastics Engineering*, 1998). The preforms also contained 0.04 percent by weight 1,2,4,5-benzenetetracarboxylic dianhydride, or pyromellitic dianhydride (PMDA). Upon extrusion, a number of bottle preforms were produced having MXD-6 dispersed within a PET matrix. Some of the preforms were then blow molded into bottles, each bottle having essentially an identical shape and a size of 500 ml's. Upon construction of the bottles, each was cut in both the vertical transverse plane and the horizontal transverse plane and etched in cold formic acid for about 60 minutes, the samples then were washed with water till neutral pH and then with acetone. Obtained samples were metalized (gold) with Agar Auto sputter Coater under subsequent condition: 20 mA for 20 seconds with argon flow. The longest dimensions of the remaining MXD-6 domains were measured using LuciaM software on the SEM photomicrographs realized at magnification of 5000×. The photomicrographs were obtained from cutting the bottle in the vertical and horizontal transverse planes and observing the longest dimension which necessarily was the dimension parallel to the surface of the article. In FIG. 7, the distribution of the results obtained from the measure of the longest dimension in the vertical transverse plane, i.e., the radial (X) direction based upon the Figures above, is reported.

Obtained data shows that during the blow-molding from preform to bottle, the MXD-6 domains increase in diameter. Generally, an increase of the average dimension from about 160 nm (preform average) to about 500 nm (bottle average) has been found. That is an increase factor of 3:1 in the radial direction. FIGS. 5 (preform) and 6 (oriented bottle) show this phenomena.

Based upon the data, the domains were found to range in length from about 400 nm to about 600 nm, with the greatest number of domains having a dimension of about 500 nm. This is within the visible spectrum. Viewing the visible spectrum, it can be determined that the region at about 500 nm is the green region (green 512 nm). From review of the chromatic circle, it can be seen that the complementary color which absorbs light in this same region is red. Therefore, attempts were made to find a red colorant which would absorb light in the green region corresponding to the range of dimensions of the domains. It will be appreciated that any colorant that absorbs in the region required of the article will suffice and it is not necessary to choose the color complementary to that region for absorption purposes based upon a chromatic circle.

Several spectrum were carried out on different kinds and colors of commercial colorants. In particular, the spectrum focused on the primary colors and the colors near to red or that contained red. Some spectrum were available from prior laboratory experimentation and other spectrum were available from the producers of the colorants. Of the spectrum analysis performed, all of the spectrum were carried out with a Perkin Elmer UV/VS spectrometer Lamda 2, with a scanning rate of 30 nm/minute from 250 nm to 780 nm. FIGS. 8A, 8B and 8C show spectrum for various yellow, red, and blue colorants, respectively. The spectrum are not normalized, as the interest here was to understand whether or not the region of absorption of the color was in the visible spectrum.

The comparison between the measurements performed with the SEM and the absorption spectrum of the primary colors available has led to an explanation why the red color seems to be the best color to cover the haze. At this point, however, one must again understand that the results of the SEM give the manufacturer an idea of what are the MXD-6 domain dimensions, but in this approach, the measurements are only an approximation, since it is essentially impossible to cut the sample in a manner that would provide every domain at its longest diameter. That is, at least some of the domains measured will be slightly smaller than the real diameter, since there is no way to insure that cutting of the bottle will occur in the exact middle of the domains. This issue has been addressed in detail herein above.

After viewing the spectrum, it is clear that, of the choices provided thus far, red appears to be the best candidate for covering haze, with the best choice being Renal RENOL® Red 4 available from ColorMatrix Corp. Transparent red samples containing the red colorant were prepared and wrapped around a known bottle of the identical size and shape previously prepared. The bottle showed visual haze prior to being wrapped. Upon wrapping the bottle, substantial masking of the haze was observed. Other bottles were prepared to include various colorants. Of those, visual analysis showed that bottles including the colorant Tersar Yellow NE 1105131 available from Clariant provided substantial masking of haze at higher concentration (4%, final bottle has an orange coloration). When viewing its spectrum in FIG. 8A, it can be seen that, unlike all of the other yellow colorants with spectrum provided, the spectrum of the Tersar Yellow colorant showed at least some absorption in the region from 500 to 550 nm and even out to about 600 nm. Thus, this colorant was suitable to mask at least some of the haze (or rather the MXD domain) of the bottle. In the same manner, bottles made with about 1 percent RENOL® Blue NE 51050340 available from Clariant also showed some partial masking of the haze. In its spectrum (FIG. 8C), it can be seen that this blue can cover a zone of the MXD-6 domains. In particular, the region starting from 500 nm can be covered. Not all of the region will be masked however, and there was still some visual haze noticeable in the bottle. The same behavior can be found in using the colorant Tersar blue 40642, also available from Clariant (FIG. 8C).

Figure 9A:
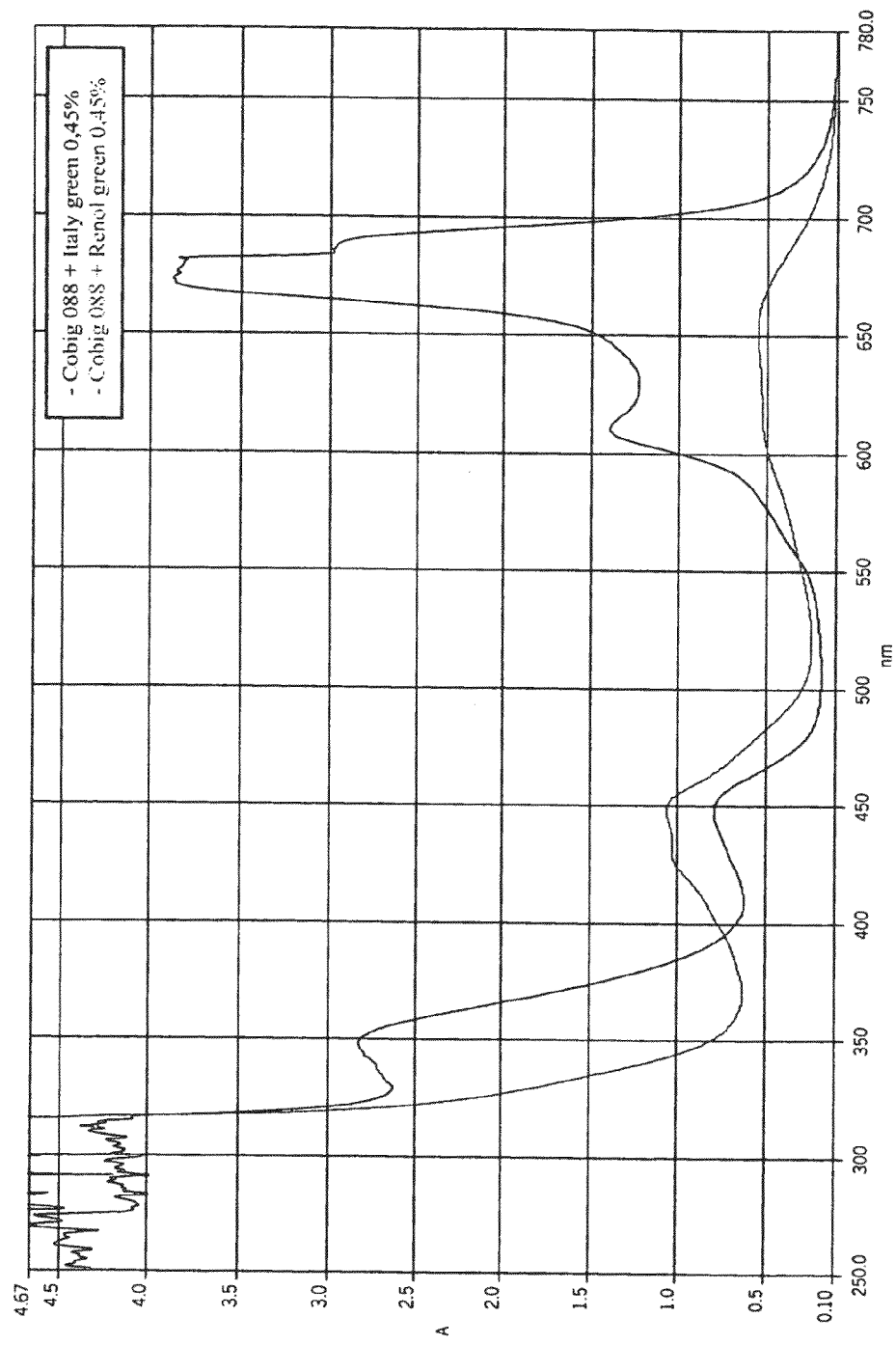
Figure 9B:
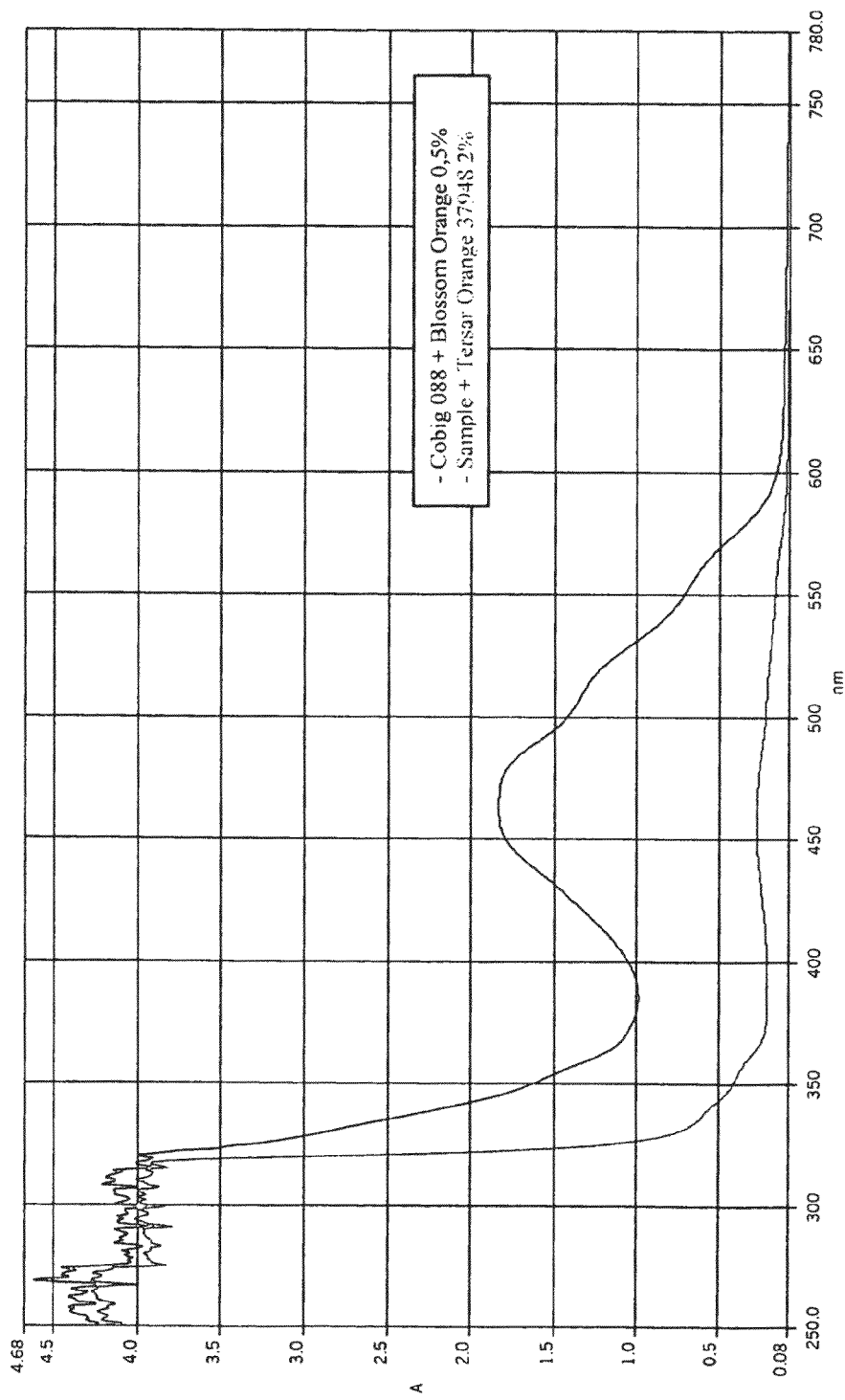
Figure 9C:
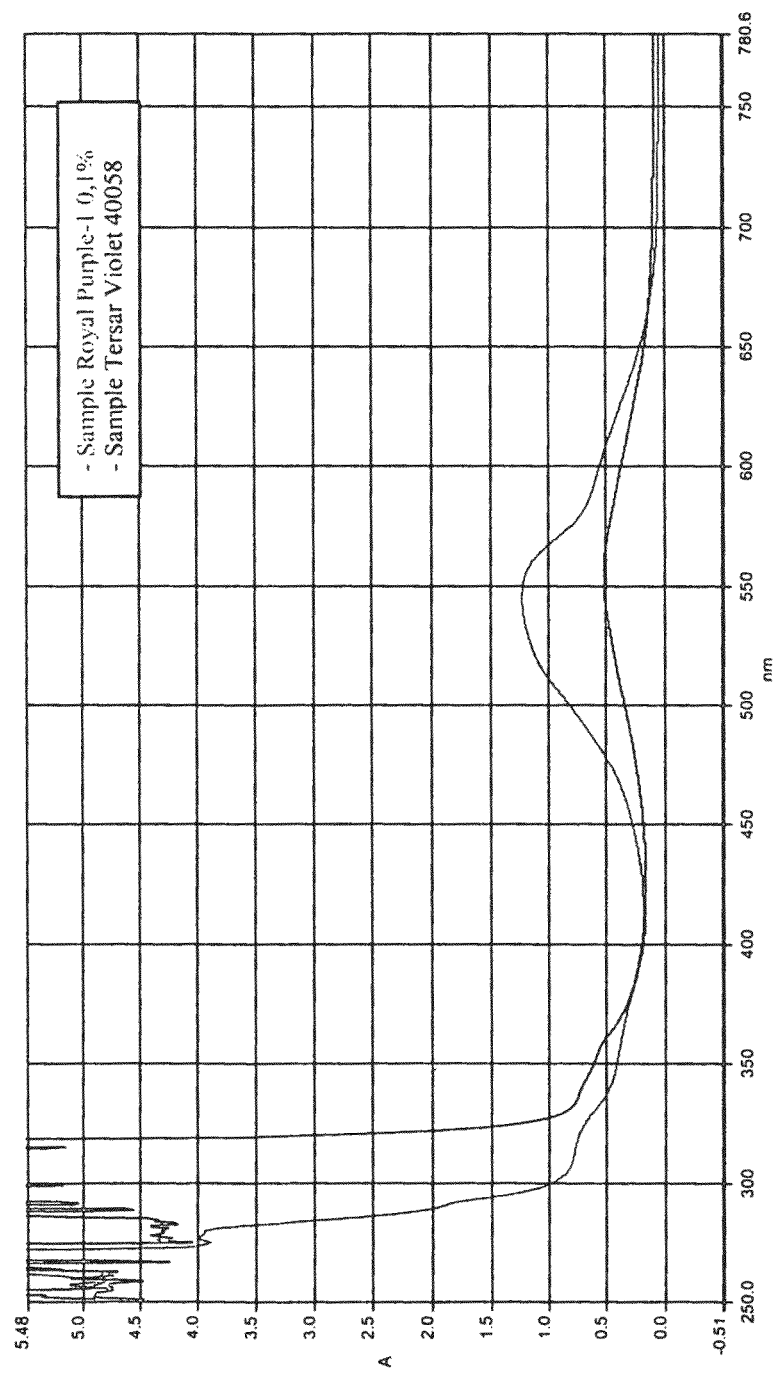
Figure 9D:
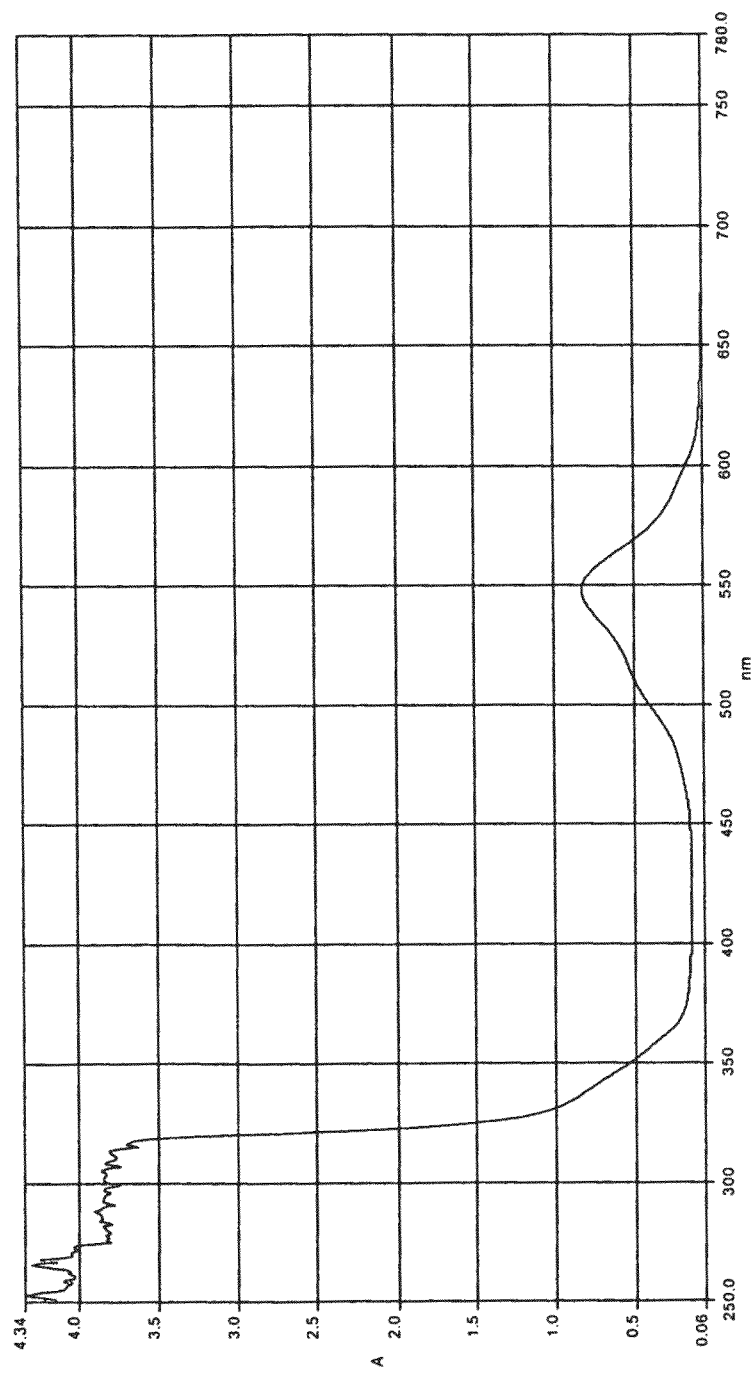

FIGS. 9A, 9B, 9C, and 9D show spectra for various green, orange, purple and pink colorants, respectively. Notably, the spectrum in FIG. 9A shows that adding this particular green colorant will not effectively mask the haze of the bottle. Production of a green colored 500 ml bottle using this green colorant confirmed this, a further demonstration that in the region between 475 and 575 (the spectrum region which is not covered by the absorption of this color) there are a large number of MXD-6 domains with this dimension. It will be understood however, that other green colorants may adequately and effectively mask the haze of the bottle. Not all green colorants absorb at the same wavelengths and in the same amounts, and it is entirely possible (as shown below) that other green colorants may provide adequate masking of the visual haze for various articles including bottles.

Bottles made from Blossom orange colorant available from ColorMatrix Corp. showed very good masking of haze, but not total. In fact, upon viewing the spectrum of this color (FIG. 9B), it is possible to observe an absorption until a wavelength of about 575 nm, not enough to cover all the MXD-6 domains. Again, however, it is possible that other orange colorants may not mask the visual haze as well as this particular orange colorant, or may mask the visual haze even better.

The spectrum (FIG. 9C) of Royal Purple-1 available from ColorMatrix Corp. is seen as one of the best colorants to mask haze of the sample 500 ml bottle, although the other purple colorant, Tersar Violet 40058, available from Clairant, also appears to be suitable. The pink spectrum (FIG. 9D) also substantially masks haze in the 450 to 600 nm region.

It should thus be evident that, given the spectrum and the tests conducted above, it has been demonstrated that there is a correlation between the dimensions of the MXD-6 domains and the absorption wavelengths of various light absorbent compositions. Where the wavelengths of the region of absorption substantially cover the range of dimensions of the MXD-6 domains, substantial masking of the visual haze in the bottle occurs.

Further testing of the present invention included the preparation of additional preforms of the type described herein above (PET+0.04% PMDA+5% MXD-6) and production of additional 500 ml bottles therefrom, as well as the manufacture of other, larger preforms made for the same concentrations of minor components and larger, 1.5 L bottles molded from these larger preforms. Bottles and preforms were then cut in the manner earlier described and again analyzed at magnification of 5000×. This time, the longest direction in both the vertical and horizontal transverse planes were analyzed. It will be appreciated that the longest dimension in the horizontal transverse plane (X-Z plane) will be the same dimension as the radial (X) axis dimension in the axial plane of the article. Similarly, the longest dimension in the vertical transverse plane (Y-Z plane) will be the same dimension as the axial (Y) axis dimension in the axial plane. SEM analysis of the preforms of the 500 ml bottle showed a mean dimension of MXD-6 domains to be around 240 (radial) to about 280 (axial), while the preforms of the 1.5 L bottle showed a mean dimension of the domains to be about 300 in both the radial (X) and axial (Y) direction. In both of these preforms, the dimensions are so low that they are before, not within, the visible spectrum and therefore, no haze is seen.

However, in the oriented bottles, the mean dimension of the MXD-6 domains was about 500 nm and about 540 nm in the radial direction for the 500 cc and 1.5 L bottles, respectively, and about 1000 nm in the axial direction for both bottles. Because of the dimensions in the axial (Y) direction were greater than the visible spectrum, one would not expect to mask any haze or see any haze from that dimension. However, in the radial (X) direction, the dimensions fall within the visible spectrum, and therefore, haze is noted in the bottles.

Further testing included the production of yet another bottle having a different resin formulation and a different amount of MXD-6. In particular, a polymer matrix was made with a polyester (VFR) resin containing 10% IPA added of PET (COBITER® 80 Polyester Resin of COBARR S.p.A.) for a final formulation of 8.6% IPA. To this resin was added 9.3% of MXD-6. A 38 gram preform was extruded from which a 1.5 L bottle was made by blow molding. SEM analysis was then preformed on both the perform and the bottle from cuts providing dimensions in the radial and the axial directions. The results showed a mean dimension of the domains in the preform to be about 330 nm in the radial (X) direction and about 320 nm in the axial (Y) direction. Again, this was well below the visible spectrum.

For the 1.5 L bottle, the mean dimension of the domains was about 620 nm in the radial (X) direction and about 900 nm in the axial (Y) direction. More importantly, it was found that the range of dimensions were from about 490 nm to about 750 nm in the radial direction and from about 660 nm to about 1140 nm in the axial direction. Thus, some of the dimensions in both directions fall within the visible spectrum.

With an aim towards understanding the prior experimental data obtained, some films with different amounts of RENOL® Red-4 colorant from ColorMatrix Corp. were prepared. The experimental data obtained showed an absorbance of this colorant in essentially the same region of the MXD6 domains radial dimension distribution of the 0.5 L bottle. Samples were made of cast films with thickness of about 200 microns on a Bausano double screw extruder with PET (CO-BITER® 80 Polyester Resin of COBARR S.p.A.) resin adding different amount of RENOL® Red-4 at 0.05%, 0.1%, 0.2%, 0.25%, and 0.5% of weight. The blend was obtained by dry blending the right amount of colorant in 2.5 kg of PET for each test in a steel container under essentially standard conditions of temperature, pressure and screw speed.

The obtained films were then placed on the 0.5 L bottle first, and then on the other bottles, to understand if the colorant is able to mask haze, and in this case, to find the minimum amount of color required. The realized film and each film's capability to cover haze are summarized in the Table I below. Since visual haze can be a subjective interpretation of the eye sight of the beholder, the capability of cover haze was analyzed by asking different people to see through the bottle covered by the different cast films with different amount of colorant and report whether they can visualize any haze.

TABLE I

TESTING OF INDIVIDUALS FOR PRESENCE OF VISUAL HAZE

| Color Concentration | Substantially Covered Haze? (Agreement of All) | | |
|---|---|---|---|
| % (RENOL ® Red) | 0.5L, 5% MXD | 1.5L, 5% MXD | 1.5L, 9.3% MXD |
| 0.05 | No | No | No |
| 0.1 | No | No | No |
| 0.2* | No | No | No |
| 0.25 | Yes | — | No |
| 0.5 | Yes | Yes | — |

*obtained by using two 0.1% films
—different interpretations (inconclusive)

The above experiment shows that, while the red color is able to cover the haze somewhat, even at 0.5%, the minimum concentration of RENOL® Red to substantially mask the haze for the 0.5 L bottle was 0.25%, while the 1.5 L bottle required a higher concentration, about 0.5%. For the 9.3% MXD bottle, the haze did not disappear when the red colorant was used. It is believed, based upon the spectrum, that significant dimensions were present outside the region at which the RENOL® Red could adequately absorb light. Consequently, haze remained.

To confirm this theory, films of different concentrations were made containing a blue colorant, namely Tersar blue 37843 from Clariant. Upon viewing its spectrum, it can be seen that the light is absorbed from about 490 nm up to about 700 nm, or very close to the end of the visible spectrum. Then, visual tests were conducted with several individuals. The results of the testing are shown in Table II below, wherein it is clear that the use of 0.5 percent of the blue colorant effectively masked the visual haze in the bottle.

TABLE II

TESTING OF INDIVIDUALS FOR PRESENCE OF VISUAL HAZE

| Color Concentration % (Tersar Blue 37843) | Substantially Covered Haze? 1.5L, 9.3% MXD |
|---|---|
| 0.05 | No |
| 0.1 | No |
| 0.25 | — |
| 0.5 | Yes |

—different interpretations (inconclusive)

In addition to the above, the physical haze of the bottles was measured. In each instance, whether the bottle was without colorant or with colorant, there was still a significant physical haze present. In at least one instance, it appears that physical haze was reduced using the RENOL® Red at 0.25% concentration, but still significantly present in the bottle.

Further experimentation has found that visual haze is a function of the total number of domains having dimensions between about 400 and about 700 nanometers that lie in the path of light shining on the article or bottle. Therefore, thickness of the wall plays a role in determining the visual haze. A thin wall will have less visual haze than its thicker counterpart, even if each wall contains the same number of domains at its surface. The amount of light absorbed must therefore take into account the thickness of the wall.

Accordingly, experiments were performed to determine what amount of light needed to be absorbed at each wavelength in the visible spectrum to start to make the visual haze recede for various sample bottles using various colorants. First however, the amount of visual haze attributed to a domain was determined by making a stretched bottle wall from a blend of PET and MXD6, determining the frequency of the domains per unit area, exposing the wall to a very narrow width of light, increasing the light intensity and measuring the change in luminance required to make a written word go from readable to hazy.

The wall of the container was prepared from a 52.5 gram preform manufactured on an Arburg 420c, 110 ton unicavity machine. The preforms contained about 4 and about 6 percent by weight MXD6 Grade 6007 from Mitsubishi Gas Chemical and about 96 and about 94 percent by weight polyethylene terephthalate grade CLEARTUF® 8006 from M&G Polymers USA, LLC, Sharon Center, Ohio, respectively. The preforms were blown into standard round bottom 2 liter bottles. The wall was removed and clamped flat between two black boards with a 66 mm×80 mm opening in the center.

The clamped boards with the sidewall in between them were suspended perpendicular to the tabletop. A 6000 Watt halogen lamp attached to a variable power source was placed about 14 inches from the wall and about 7 inches from the top of the table. The light source was shielded from the wall by placing a container over the lamp. The container had a 45 mm hole in the side located about 7 inches from the table top to allow the light to pass from the source and strike the cut out bottle sidewall.

The hole's 45 mm is slightly smaller than the 50 mm diameter light filters available from Andover Corporation, Salem, N.H.

A black paper with a single line of 12 point New Times Roman type was placed between the sample and the light source, but 4 inches away from the sample. The line of type was facing the sample. The edge of the sheet of paper was aligned with the edge of the hole in the bucket so that the sheet was perpendicular to the table top, parallel to the black board, and on the tangent of cylinder whose diameter is defined by the hole and height running from the bucket hole to the black boards. The writing was aligned about 7 inches above the table top aligned with the center of the sidewall sample, the center of the hole, and even with the light source. The line of type was observed through the sidewall sample. As the amount of light on the sample increased, the more distorted the line of type became. The amount of luminance required to distort 4 letters from the edge tangent to the defined cylinder was considered hazy.

Filters obtained from Andover Corp were placed in front of the hole to allow very narrow wavelengths of light to strike the sidewall. The narrowest wavelength filters were chosen due to their sharp cutoff of 2 nm. The wider wavelength filters have much less defined cutoff ranging over 10 to 20 nm and the amount of visual haze contributed by domains in the whole region will vary with the intensity of light in the cut off.

The amount of light required to create visual haze was measured as follows. The filters essentially removed about 96% of the visual light. Thus, the background light was reduced so that the amount of light passing through the filter was a significant percentage to cause the visual haze.

Luminance was measured using an EA30 light meter from Extech Instruments Corporation, Waltham, Mass. Light was measured at 2 points. The first point measured the light traveling parallel to the boards and striking the table top. This point was directly above the sample. This was defined as the top light. The other point measured the light traveling parallel to the table top and striking the sample. The meter was placed directly in front of the sample facing the light source. Background light was defined as the amount of light striking the sample when the light source is turned off.

The intensity of the filtered source light was increased until the first four letters of the typed line started to become hazy by looking into the light at the type through the sample. This measurement was called Onset Haze. The intensity was then increased until the first four letters of the typed line became illegible. This was called Max Haze. Each point represents the average of three to five measurements depending upon the deviation between measurements.

This evaluation was done for a 4% and a 6% blend of MXD6 at every 50 wavelengths beginning at 500 to 650. The measurement at 450 nm was not used as the Extech's manual notes that the meter does not have a valid response. The luminance at 400 nm and 700 nm were also not measured because the outer limits of the visible light vary from person to person. From the data taken from this experiment, the percent of light scattered per domain per unit thickness of the wall of the sample article was determined.

The absorbance raw data was normalized to account for the fact that the domains were concentrated at a few wavelengths. While the luminance was increased, only those wavelengths that correlate to domains were reflected. It is believed that a good approximation to determine how much of the luminance was reflected was to reduce the increased luminance by the number of wavelengths passing through the filter which wavelengths have domain sizes correlating to them. Once this is done for the filter bandwidth, the relationships become apparent. In short, the larger the number of domains, the less light is needed to create the onset of haze.

From the data obtained, it was determined that the absorbent composition had to be able to do two things. First, the absorption of light by the absorbent composition must occur at at least one wavelength correlated with the size of a domain. Because the domains are usually a plurality and spread across the visible spectrum, absorbance at many of the wavelengths is likely required. For instance, it is conceivable that if all the domains were at 500 nm, then only absorption around 500 nm would be needed. Likewise, if 95% of the domains of a PET/6% MXD6 blend were at 500 nm, then the majority, if not all the absorption, would need to occur at 500 nm. Alternatively, absorbing light in the other regions, and not absorbing the light around 500 nm would have a limited impact on the visual haze.

However, contrary to the above example, it was found that the domains were scattered throughout the visible spectrum, but with several wavelength regions having substantially more domains than others. Nevertheless, the absorbent composition does not have to absorb in all regions containing domains, but must absorb enough light throughout the spectrum to prevent the light from scattering. Since more scattering occurs in regions with more domains, more absorbance is needed at wavelengths with more domains. It has been determined that the onset of the haze begins when the light reaches 60% of the total light striking this 15 mil wall. Stated another way, a minimum of 40% of the light striking the 15 mil wall must be absorbed at a wavelength to begin to have an impact on the visual haze contributed by the domain at that wavelength.

For example, for a 15 mil wall, if 80% of the domains were at 500 nm and 20% were at 650 nm, the absorbent composition need only absorb 50% of the light at 500 nm which is 40% of the total to start to see an impact on the haze. There would be no impact on visual haze if all the light was absorbed at 650 nm for that is only 20% of the total light, the remaining 20% of the light absorption would have to be achieved by absorbing 25% of the light at 500 nm.

This concept has been demonstrated in the following experiment. MXD6 6007 was melt blended into polyethylene terephthalate and made into a 16 oz. bottles. The bottles contained 3% of a colorant (Sprite Green) with absorbance and a domain distribution as shown in comparison in FIG. 10. The wall was 15 mils thick. Even though there is only an absorbance of 0.07 (15% of the light) between 500 and 550 nm, and there are 27 domains in that region, there was still strong enough absorbance elsewhere to substantially reduce the visual haze of the bottle sample. Since the 27 domains are only 16% of the total 166 domains in the visual spectrum (400 to 700 nm), the stronger absorbance elsewhere reduced the haze. When calculating for the total amount of relative light available for reflectance (i.e., not absorbed by the colorant) for the bottle sample, that amount is less than 9.6. Thus, while the bottle has a slight amount of visual haze, the absorbance of the colorant is considered enough to substantially cover the dimensions of the domains found in the article. That is, the overall visual haze has been substantially reduced. Variations to further reduce the visual haze could be made by increasing the amount of or the type of absorbent composition(s), which would, in turn, change the absorbances at those wavelengths between 500 and 550 nm. To the extent that all of the other wavelengths are "covered," any appreciable change in further masking the visual haze of the article may come from increasing the absorbance at those wavelengths between 500 and 550.

Based upon these studies, it has been determined that the amount of light absorbed within the visible spectrum by the light absorbent composition must be such that the summation of the percent of the incident light reflected (i.e., not absorbed) at a wavelength times the number of domains per unit area (i.e., square microns) at the wavelength, and assuming constant intensity of light, must be less than 9.6. That is, the light absorbent composition must absorb light in the visible spectrum such that X is less than 9.6 in the equation $$X = \Sigma (L_i) \times (N_i)$$

where $L_i$ is the percent of light available to reflect at a wavelength i and $N_i$ is the number of domains per hundred square microns ($10^8$ nm$^2$) at wavelength i, and where i ranges from 400 nm to 700 nm (i.e., the visible spectrum).

The thickness of the article is captured in the absorbance reading taken for the wall of the article. If the intensity of the light a given wavelength is not constant, it must be included as noted previously above. If 90% of the light occurs at one wavelength correlating to the size of one domain, then more absorbance of the total light is needed at that wavelength.

The number of domains is determined by the SEM. The percent light absorbed was obtained by the absorbance spectrum which is a function of the thickness of the wall. The fraction of light is the lumens or luminance at that wavelength divided by the total lumens or luminance of the visible spectrum. For a light of constant intensity, the number is $\frac{1}{300}$ because the total intensity is equally distributed across the spectrum of 400-700 nanometers.

Still further confirmation of the amount of light needed to be absorbed by the light absorbent composition is set forth in FIGS. 11 and 12. Both FIGS. 11 and 12 include a representative plot graph depicting the number of domains present in the article (in this case, a 2 L bottle) at each nanometer between 400 and 700. It will be appreciated that there are no domains at certain sizes and more than one domain at other sizes. Notably, however, the domains are fairly well spread out throughout the entire range of 400 nm to 700 nm. Superimposed over each plot graph in FIGS. 11 and 12 are representative graphs of the percent of light absorbed at each wavelength between 400 nm and 700 nm for a number of different colorants in amounts ranging from 0.05% to 0.5% for articles comprising PET/6% MXD6 (FIG. 11) and PET/8% MXD6 (FIG. 12). In particular, there are red and green colorants used in FIG. 11, and red and blue colorants used in FIG. 12.

It is to be understood that these graphs show the percent of light absorbed ($A_i$), rather than the percent of light available for reflectance ($L_i$). Thus, the determination of whether the colorant employed will substantially cover the dimensions of the domains present in the article can essentially be seen by determining whether or not the latter graph covers the number of domains present. However, increasing the percentage of light absorbed will not necessarily make it more likely the colorant will be able to mask the visual haze of the article. One must determine the X value to determine this. Using both the domain plot graph and the percent of light absorbed graph, X can then be determined for each of the colorants employed. The X value based upon the equation present above for each colorant is provided in Table III.

TABLE III

X VALUES FOR COLORANTS USED IN PET/MXD6 BLENDS

| | RENOL® Red 0.05% | RENOL® Red 0.1% | Green 0.1% | Green 0.25% | Green 0.5% | Tersar Blue 0.05% | Tersar Blue 0.1% |
|---|---|---|---|---|---|---|---|
| 6% MXD | 10.602 | 9.167 | 9.195 | 7.493 | 5.573 | | |
| 8% MXD | 9.899 | 8.167 | | | | 9.953 | 7.272 |

These bottles were then evaluated separately and subjectively to determine whether they reduced or eliminated visual haze. It was determined that neither of the 0.05% RENOL® Reds were sufficient to reduce haze, but that at 0.1% the Reds did start to adequately reduce visual haze. Likewise, the 0.05% Tersar Blue was not sufficient to reduce visual haze, but the 0.1% Tersar Blue was adequate to reduce the visual haze of the bottle. For the Greens, each green reduced the visual haze to some extent, with higher amount of colorant providing for a better visually acceptable product with reduced visual haze. This was true even though a notable amount of light was transmitted between about 480 nm and 540 nm. However, this green colorant absorbs substantially all, if not all, of the other wavelengths where domains are present, including a significant amount of light at about 584 nm, where a large number of domains existed. Thus, upon calculation of the X value for the colorant, it was determined to be well within the limits of X being less than 9.6. Experimentation has shown that the commencement of some masking of haze can be set at X=9.55. Thus, it should be evident that, provided the total amount of relative light not absorbed is less than 9.6, at least some of the haze visible to the naked eye of an observer will be masked.

Thus, it should be evident that the haze problem found in containers having polyamides and other incompatible fillers added to a polymer matrix, particularly those added to improve the gas barrier strength of the container, can be masked (or drastically reduced) adding the right amount of light absorbent composition. There is a close correlation between the dimensions of at least some of the domains in the bottle and absorption wavelength of the absorbent composition. In fact, the experimental data carried out demonstrates the possibility that haze can be visually masked using a specific colorant or a combination of colorants, as was analyzed and determined in the 0.5 L bottles having visual haze.

Additional study has noted that, if there is no change of MXD6 domain dimensions, even after changing of the size of the bottles, and the same PET matrix is used, changing bottle size (to 1.5 L bottles) has little effect on the range of domain dimensions, and therefore, visual haze can be substantially masked by adding the same colorant, although a higher amount of colorant may be preferred.

However, if the PET matrix is changed, and/or the amount of MXD6 concentration is increased in the bottle added in a PET, there is a change in the distribution of dimensions of MXD domains. In that case, it was found that the dimensions increased in size by about 100 nm and therefore, other light absorbent compositions were required to mask the visual haze of the bottle. In the instance of a 1.5 L bottle having 9.3% MXD-6, a blue colorant better absorbs light in the range of wavelengths correlating to the range of dimensions of the domains in that bottle.

Thus, it should be evident that the concepts and methods of the present invention are highly effective in providing transparent articles comprising blends of thermoplastic polymer and incompatible fillers, preferably having reduced gas permeability, that solve the haze problem associated with such articles. The visible haze of the bottle may be substantially masked where light is absorbed at wavelengths that at least substantially correlate to the range of dimensions found for the domains present in the article. The invention is particularly suited for beer beverage bottles, but is not necessarily limited thereto. The concepts and method of the present invention can be used separately with other applications, equipment, methods and the like, as well as for the manufacture of other oriented articles.

Based upon the foregoing disclosure, it should now be apparent that the use of light absorbent compositions can substantially mask the haze of a transparent article when the haze is caused by domains having dimensions within the visible spectrum. Thus, the dispersion of an incompatible filler and, often, a light absorbent composition, in a thermoplastic polymer matrix in the production of transparent, preferably oriented, articles such as bottles and the like, as described herein, will carry out one or more of the aspects set forth herein above. It is, therefore, to be understood that any variations evident fall within the scope of the claimed invention and thus, the selection of specific component elements can be determined without departing from the spirit of the invention herein disclosed and described. In particular, colorants according to the present invention are not necessarily limited to those of a dye or a pigment. Moreover, as noted herein above, other polyamides can be substituted for the MXD6 employed in the examples. Thus, the scope of the invention shall include all modifications and variations that may fall within the scope of the attached claims.

The invention claimed is:

1. A colored article comprising:
   a thermoplastic polymer matrix;
   a plurality of domains in a single continuous portion of the colored article wherein said domains are dispersed in the thermoplastic polymer matrix and encompass at least one incompatible filler; and
   a film containing one or more light absorbing compositions overlaying the thermoplastic matrix having dispersed domains;
   wherein said domains each have a dimension in an axial plane of the colored article, the dimensions of at least some of said domains in said axial plane of the colored article fall within a range of from about 400 nm to about 700 nm, and the one or more light absorbing compositions is present in an effective amount to alter the light absorption of the colored article so that the light absorbed by the colored article is such that the total amount of relative light available for reflectance, X, is less than 9.6 in an equation $$X = \Sigma (1 - A_i) \times N_i$$

where $A_i$ is the percent of light absorbed at a wavelength i without the incompatible filler present, $N_i$ is the number of domains per hundred square microns at the wavelength i, and the wavelength i ranges from 400 nm to 700 nm.

2. The colored article of claim 1, wherein said colored article is an oriented container and wherein the single continuous portion of the colored article is a sidewall of the container.

3. The colored article of claim 1, wherein said colored article is a plastic bottle and wherein the single continuous portion of the colored article is a sidewall of the bottle.

4. The colored article of claim 1, wherein the thermoplastic polymer matrix is selected from the group consisting of linear polyesters, branched polyesters, polyamides, polystyrenes, polycarbonates, polyvinylchlorides, polyvinylidene dichlorides, polyacrylamides, polyacrylonitrites, polyvinylacetate, polyvinyl methyl ether, ethylene vinyl acetate copolymer, ethylene methyl acrylate copolymer, low molecular weight polyolefins having 2 to 8 carbon atoms, and copolymers, terpolymers, and blends thereof.

5. The colored article of claim 1, wherein said thermoplastic polymer matrix is a linear polyester matrix selected from the group consisting of polyethylene terephthalate, polyethylene naphthalate, and polybutylene terephthalate, polytrimethylene terephthalate, polyethylene isophthalate and copolymers, terpolymers, and blends thereof.

6. The colored article of claim 5, wherein said linear polyester matrix is polyethylene terephthalate or a copolymer thereof.

7. The colored article of claim 1, wherein said incompatible filler is a polyamide.

8. The colored article of claim 1, wherein said incompatible filler is poly(m-xylylene adipamide).

9. The colored article of claim 1, wherein said incompatible filler is a gas barrier strengthening filler.

10. The colored article of claim 1, wherein the article comprises from about 99.5 to about 50 percent by weight thermoplastic polymer and from about 0.5 to about 50 percent by weight incompatible filler.

11. The colored article of claim 1, wherein said article comprises from about 99.5 to about 50 percent by weight polyethylene terephthalate and from about 0.5 to about 50 percent by weight poly(m-xylylene adipamide).

12. The colored article of claim 1, wherein said light absorbent composition is a colorant.

13. The colored article of claim 12, wherein the colorant comprises a red colorant.

14. The colored article of claim 12, wherein the colorant comprises a blue colorant.

15. The colored article of claim 12, wherein the colorant comprises a yellow colorant.

16. The colored article of claim 12, wherein the colorant comprises a green colorant.

* * * * *